United States Patent
Danneffel et al.

(10) Patent No.: US 12,259,080 B2
(45) Date of Patent: Mar. 25, 2025

(54) PIPE THREAD PROTECTOR WITH REMOVABLE END MEMBER AND INTERFERENCE-FIT PROTRUSION

(71) Applicant: Universal Moulding Co. Ltd., Port Coquitlam (CA)

(72) Inventors: John Danneffel, Port Coquitlam (CA); Max Danneffel, Port Coquitlam (CA)

(73) Assignee: Universal Moulding Co. Ltd., Port Coquitlam (CA)

( * ) Notice: Subject to any disclaimer, the term of this patent is extended or adjusted under 35 U.S.C. 154(b) by 477 days.

(21) Appl. No.: 17/592,395

(22) Filed: Feb. 3, 2022

(65) Prior Publication Data
US 2022/0243856 A1    Aug. 4, 2022

Related U.S. Application Data

(60) Provisional application No. 63/175,424, filed on Apr. 15, 2021, provisional application No. 63/145,766, filed on Feb. 4, 2021.

(51) Int. Cl.
*F16L 57/00*      (2006.01)
*B65D 59/02*      (2006.01)
(Continued)

(52) U.S. Cl.
CPC ............ *F16L 57/005* (2013.01); *B65D 59/02* (2013.01); *B65D 59/06* (2013.01); *F16L 15/002* (2013.01)

(58) Field of Classification Search
CPC .................................................. F16L 57/005
(Continued)

(56) References Cited

U.S. PATENT DOCUMENTS

| | | | | |
|---|---|---|---|---|
| 1,675,142 A | * | 6/1928 | Shrum | F16L 57/005 |
| | | | | 138/96 T |
| 1,788,253 A | * | 1/1931 | Shrum | F16L 57/005 |
| | | | | 138/96 T |

(Continued)

FOREIGN PATENT DOCUMENTS

| | | |
|---|---|---|
| CN | 304046974 S | 2/2017 |
| CN | 211224665 U | 8/2020 |

(Continued)

OTHER PUBLICATIONS

M&P Flange & Pipe Protection, Inc., "Drill Pipe Thread Protectors", Internet Archive—Wayback Machine, https://web.archive.org/web/20200928213511/https://m-p.com/product/drill-pipe-thread-protectors/, Sep. 28, 2020.

(Continued)

*Primary Examiner* — Patrick F Brinson
(74) *Attorney, Agent, or Firm* — Nicholas Garner; Oyen Wiggs Green & Mutala LLP

(57) ABSTRACT

There is provided a pipe thread protector according to a first aspect. The pipe thread protector includes a tubular body shaped to protect a threaded end portion of a pipe or a pipe coupling. The tubular body includes an inner portion with a first of right-handed and left-handed threading. The tubular body includes an outer portion with a second of right-handed and left-handed threading. The pipe thread protector includes an end member. The end member includes the second of right-handed and left-handed threading via which the end member threadably couples to the outer portion of the tubular body. The pipe thread protector includes a locking member with a first position in which removal of the end member from the tubular body is inhibited. The locking member is moveable from the first position thereof to a (Continued)

second position in which the end member is selectively removable from the tubular body.

20 Claims, 16 Drawing Sheets

(51) Int. Cl.
*B65D 59/06* (2006.01)
*F16L 15/00* (2006.01)

(58) Field of Classification Search
USPC .......................................................... 138/96 T
See application file for complete search history.

(56) References Cited

U.S. PATENT DOCUMENTS

| | | | |
|---|---|---|---|
| 2,055,646 A | | 9/1936 | Bosley |
| 2,156,113 A | * | 4/1939 | Engstrom ............. B65D 59/02 |
| | | | 138/96 T |
| 2,727,651 A | | 12/1955 | Mickelson |
| 2,737,205 A | | 3/1956 | Stringfield |
| D194,437 S | | 1/1963 | Salter |
| 3,074,579 A | | 1/1963 | Miller |
| 4,020,873 A | * | 5/1977 | Palarino ................ F16L 57/005 |
| | | | 138/96 T |
| 4,020,874 A | * | 5/1977 | Palarino ................ F16L 57/005 |
| | | | 138/96 T |
| 4,036,261 A | | 7/1977 | Hauk |
| 4,139,023 A | | 2/1979 | Turley |
| 4,269,232 A | | 5/1981 | Witschi |
| 4,366,971 A | | 1/1983 | Lula |
| 4,380,304 A | | 4/1983 | Anderson |
| 4,429,719 A | * | 2/1984 | Mosing ................... E21B 12/04 |
| | | | 138/96 T |
| 4,487,228 A | | 12/1984 | Waldo et al. |
| 4,549,337 A | | 10/1985 | Newell et al. |
| D281,350 S | | 11/1985 | Heier |
| 4,553,567 A | | 11/1985 | Telander |
| 4,796,668 A | | 1/1989 | Depret |
| 5,195,562 A | | 3/1993 | Dreyfuss et al. |
| D402,354 S | | 12/1998 | Strong et al. |
| 6,085,478 A | | 7/2000 | Workman |
| 6,196,270 B1 | | 3/2001 | Richards et al. |
| 6,367,508 B1 | | 4/2002 | Richards et al. |
| 7,284,770 B2 | | 10/2007 | Dell'erba |
| 7,404,419 B2 | | 7/2008 | Pajaro Gonzalez et al. |
| 7,469,721 B2 | | 12/2008 | Takano |
| D613,827 S | | 4/2010 | Damaske et al. |
| D678,923 S | | 3/2013 | Stolz et al. |
| 9,206,930 B2 | | 12/2015 | Courtois et al. |
| D762,825 S | | 8/2016 | Walker et al. |
| 9,523,458 B2 | | 12/2016 | Yamamoto et al. |
| D784,497 S | | 4/2017 | Vaz et al. |
| D788,886 S | | 6/2017 | Salzer |
| 9,828,150 B2 | | 11/2017 | Danneffel et al. |
| 10,274,123 B2 | | 4/2019 | Danneffel et al. |
| D899,239 S | | 10/2020 | Schatzl |
| 10,954,045 B2 | | 3/2021 | Knight et al. |
| D921,852 S | | 6/2021 | Ball et al. |
| D932,596 S | | 10/2021 | Melaccio |
| D933,788 S | | 10/2021 | Banks |
| D956,522 S | | 7/2022 | Smith |
| 2004/0200525 A1 | | 10/2004 | Goodson et al. |
| 2004/0201131 A1 | | 10/2004 | Goodson et al. |
| 2005/0045240 A1 | | 3/2005 | Casteran |
| 2006/0042709 A1 | | 3/2006 | Takano |
| 2006/0266428 A1 | | 11/2006 | Pajaro Gonzalez et al. |
| 2007/0113910 A1 | | 5/2007 | Pagura et al. |
| 2008/0092977 A1 | | 4/2008 | Zeyfang |
| 2008/0190509 A1 | | 8/2008 | Cox |
| 2011/0148103 A1 | | 6/2011 | Courtois et al. |
| 2011/0265904 A1 | | 11/2011 | Baker et al. |
| 2012/0076613 A1 | | 3/2012 | Ishida |
| 2013/0105028 A1 | | 5/2013 | Lockard et al. |
| 2013/0213516 A1 | | 8/2013 | Clem et al. |
| 2013/0299037 A1 | | 11/2013 | Drouin et al. |
| 2014/0261849 A1 | | 9/2014 | Danneffel et al. |
| 2016/0312544 A1 | | 10/2016 | Whitefield et al. |
| 2019/0375564 A1 | | 12/2019 | Knight et al. |
| 2021/0199232 A1 | | 7/2021 | Egger et al. |
| 2021/0296869 A1 | | 9/2021 | Smith |
| 2023/0003332 A1 | | 1/2023 | Egger et al. |

FOREIGN PATENT DOCUMENTS

| | | |
|---|---|---|
| CN | 308036085 S | 5/2023 |
| JP | D1661385 | 6/2020 |
| KR | 300767531.0000 | 10/2014 |
| KR | 301076716.0000 | 10/2020 |
| KR | 301155709.0000 | 3/2022 |
| RU | 171254 U1 | 5/2017 |
| WO | 2019231322 A1 | 12/2019 |

OTHER PUBLICATIONS

Tenaris Hydril, Running Manual, IDM Code GDL00337/2, dated Nov. 2016.

* cited by examiner

PIPE THREAD PROTECTOR WITH REMOVABLE END MEMBER AND INTERFERENCE-FIT PROTRUSION

CROSS REFERENCE TO RELATED APPLICATIONS

This application is a non-provisional of U.S. Provisional Patent Application No. 63/175,424 filed in the United States Patent and Trademark Office on 15 Apr. 2021, the disclosure of which is incorporated herein by reference and priority to which is claimed. This application further claims priority to U.S. Provisional Patent Application No. 63/145,766 filed in the United States Patent and Trademark Office on 4 Feb. 2021, the disclosure of which is also incorporated herein by reference.

BACKGROUND OF THE INVENTION

Field of the Invention

There is provided a pipe thread protector. In particular, there is provided a pipe thread protector with a removable end member. There is also provided a pipe thread protector with an interference-fit protrusion.

Description of the Related Art

Most oil drillers currently require their down-hole oil pipe to be drifted prior to going into the ground. Drifting the pipe is a process of pulling a drift mandrel through the inside length of a pipe to ensure that the inside of the pipe is clear of debris and within required tolerance. This process ensures that smaller pipes, tools, and other items can be passed through the pipe during use. Drifting is typically performed at the rig site, prior to the pipes going into the ground. Typically, thread protectors on both ends of the pipe must be removed prior to running a drift mandrel through the length of the pipe. The thread protectors are then re-installed upon completion of the drifting process.

There may be a need for a driftable protector that can provide a high level of impact resistance and can be produced in a more cost-effective manner.

BRIEF SUMMARY OF INVENTION

There is provided, and it is an object to provide, an improved pipe thread protector disclosed herein.

There is accordingly provided a pipe thread protector assembly according to one aspect. The assembly includes a tubular body shaped to protect a threaded end portion of a pipe or a pipe coupling and receive a cylindrical member therethrough for drifting the pipe. The assembly includes an impact-absorbing end member connecting to and extending laterally across the tubular body. The end member is selectively removable from the tubular body. The end member is shaped to inhibit inward deformation of the tubular body.

There is accordingly provided a pipe thread protector according to another aspect. The pipe thread protector includes a tubular body shaped to protect a threaded end portion of a pipe or a pipe coupling. The tubular body includes an inner portion with a first of right-handed and left-handed threading. The tubular body includes an outer portion with a second of right-handed and left-handed threading. The pipe thread protector includes an end member. The end member includes the second of right-handed and left-handed threading via which the end member threadably couples to the outer portion of the tubular body.

There is also provided a pipe thread protector according to a further aspect. The pipe thread protector includes a tubular body shaped to protect a threaded end portion of a pipe or a pipe coupling. The pipe thread protector includes an end member with an inner portion which is frustoconical in outer shape. The end member is configured to extend laterally across and threadably couple to the tubular body.

There is further provided a pipe thread protector according to an additional aspect. The pipe thread protector includes a tubular body shaped to protect a threaded end portion of a pipe or a pipe coupling. The pipe thread protector includes an end member shaped to extend laterally across and selectively couple to the tubular body. The end member has a thickness that is at least in part equal to or greater than that of the tubular body.

There is additionally provided a pipe thread protector according to yet another aspect. The pipe thread protector includes a tubular body shaped to protect a threaded end portion of a pipe or a pipe coupling. The tubular body has an outer end, an inner end, and a tapered bore which tapers from the outer end thereof towards the inner end thereof. The pipe thread protector includes an end member shaped to be received in part within the tapered bore. The end member extends laterally across and removably couples to the tubular body.

There is yet also provided a pipe thread protector according to yet a further aspect. The pipe thread protector includes a tubular body shaped to protect a threaded end portion of a pipe or a pipe coupling. The pipe thread protector includes an end member shaped to removably couple to and extend laterally across the tubular body. The pipe thread protector includes a locking member. The locking member has a first position in which removal of the end member from the tubular body is inhibited. The locking member is moveable from the first position thereof to a second position in which the end member is selectively removable from the tubular body.

There is further provided a pipe thread protector assembly according to yet an additional aspect. The pipe thread protector assembly includes a tubular body shaped to protect a threaded end portion of a pipe or a pipe coupling. The pipe thread protector assembly includes an end member shaped to removably couple to and extend laterally across a first end portion of the tubular body. The pipe thread protector assembly includes a seal coupled to and extending about a second end portion of the tubular body spaced-apart from the first end portion of the tubular body.

There is yet further provided a pipe thread protector according to another aspect. The pipe thread protector includes a tubular body shaped to protect a threaded end portion of the pipe coupling. The pipe thread protector includes an end member removably coupled to the tubular body. The pipe thread protector includes a seal extending about the tubular body and shaped to seal an inner shoulder of the pipe coupling.

There is yet additionally provided a pipe thread protector according to a further aspect. The pipe thread protector includes a tubular body shaped to protect a threaded end portion of a pipe or a pipe coupling. The pipe thread protector includes an end member removably coupled to the tubular body. The end member has a central recessed region extending within the tubular body. The end member is shaped to receive a hook at least in part.

There is yet additionally provided a pipe thread protector according to an additional aspect. The pipe thread protector includes a tubular body having an inner end and an outer end spaced-apart from the inner end thereof. The tubular body has an inner surface along which extends threading from the inner end thereof towards the outer end thereof. The pipe thread protector includes a protrusion coupled to and extending radially inwards from the inner surface of the tubular body. The protrusion is configured to deform upon rotatably pipe coupling the tubular body to a male threaded end portion of a pipe. The protrusion so deformed inhibits removal of the pipe from the tubular body thereafter.

There is yet further provided a removable end member for a pipe thread protector. The end member includes a base member shaped to extend laterally across an open outer end of the pipe thread protector. The end member includes one or more protrusions coupled to and extending axially outwards from an outer end of the base member. The end member includes an inner annular member coupled to, extending axially from, and tapering relative to an inner end of the base member.

There is also provided a pipe thread protector according to yet another aspect. The pipe thread protector includes a tubular body shaped to protect a threaded end portion of a pipe or a pipe coupling. The pipe thread protector includes a seal extending about the tubular body. The seal is triangular in lateral cross-section.

There is yet also provided a method of transporting and drifting a pipe using the pipe thread protector assembly as herein described and/or described above. The method includes coupling together the tubular body and end member of the pipe thread protector assembly. The method may include moving a locking member into the locked position thereof in which removal of the end member from the tubular body is inhibited. The method includes threadably connecting the tubular body and the end member so coupled together to a threaded end portion of a pipe or a pipe coupling which couples to the threaded end portion of the pipe, with debris being inhibited from contacting the outer end face and interior of the pipe thereby. The method includes transporting the pipe, with the tubular body and the end member so coupled thereto, to a work site.

The method includes drifting the pipe by removing the end member from the tubular body so coupled to the pipe coupling. Within this removal step, the method may include moving the locking member from the locked position to the unlocked position in which the end member is selectively removable from the tubular body. The method thereafter includes biasing the cylindrical member having pre-determined outer diameter through the tubular body and into the pipe. The method includes determining that the pipe is acceptable if the cylindrical member extends therein, and determining that the pipe is unacceptable if the cylindrical member is inhibited from extending therein. The method may further include after the biasing step, re-connecting the end member to the tubular body, with debris being inhibited from contacting the outer end face and interior of the pipe once more.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
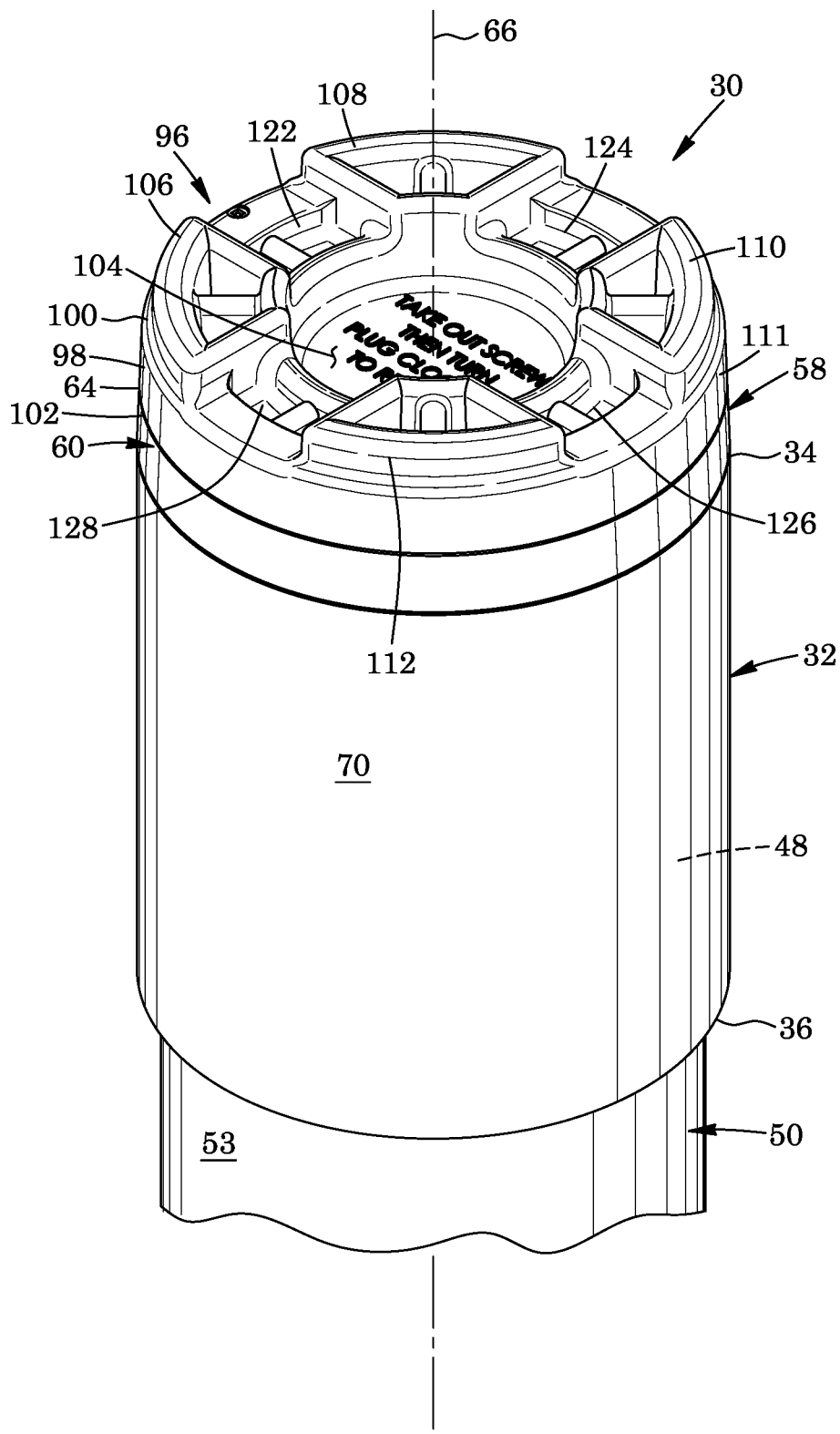
FIG. 1 is an outer end, bottom, left side perspective view of a pipe thread protector assembly according to one embodiment, together with an end portion of a pipe shown in fragment, the assembly including an open box protector comprising a tubular body with a removable end plug threadably coupled to the tubular body thereof, and a pipe coupling threadably connecting the tubular body and pipe together.
Figure 2:
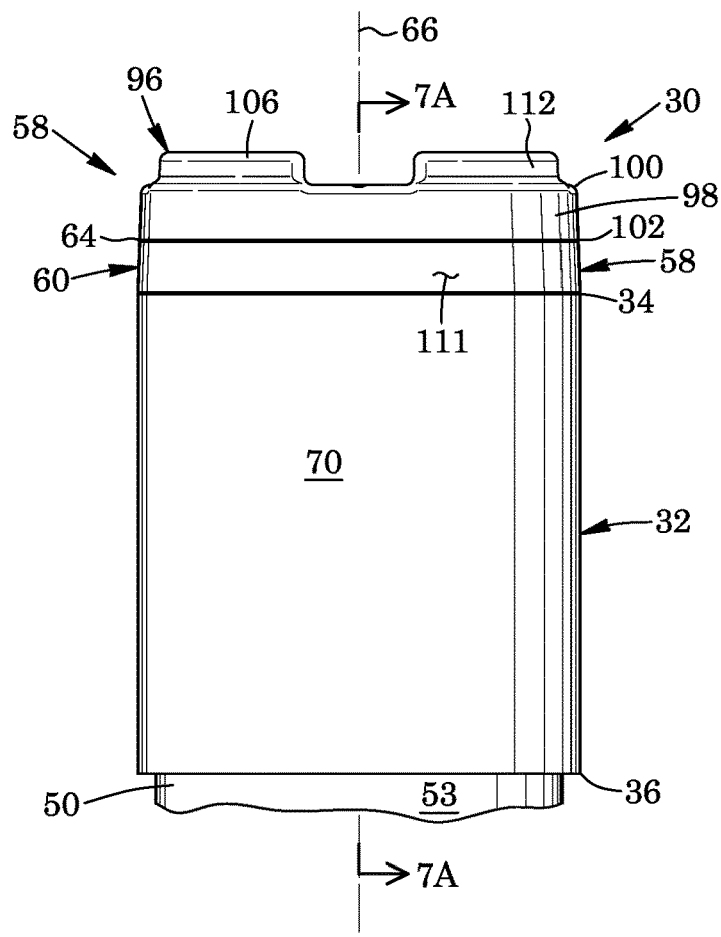
FIG. 2 is a bottom plan view thereof.
Figure 3:
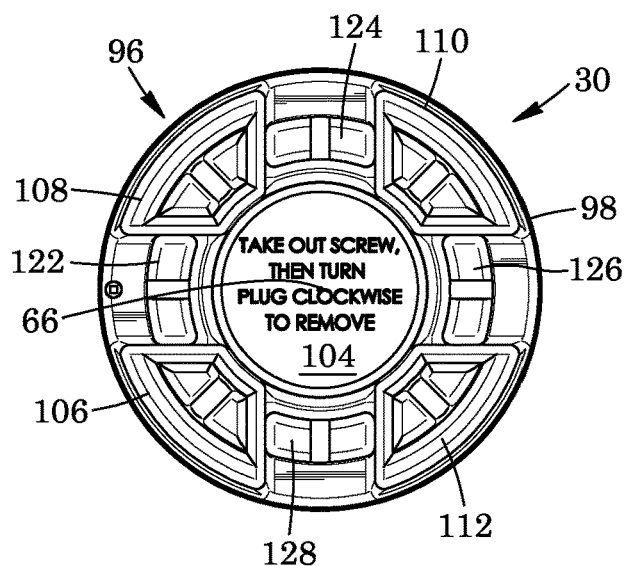
FIG. 3 is an outer end elevation view thereof.

Referring to the drawings and first to FIG. 1, there is shown a pipe thread protector assembly 30 according to one embodiment. The pipe thread protector assembly includes a conduit coupling, in this example pipe coupling 32. The pipe coupling is tubular and has a first or outer end 34 and a second or inner end 36 spaced-apart from the outer end thereof. Pipe coupling 32 has an interior 33 about which the pipe coupling extends.

Figure 7A:
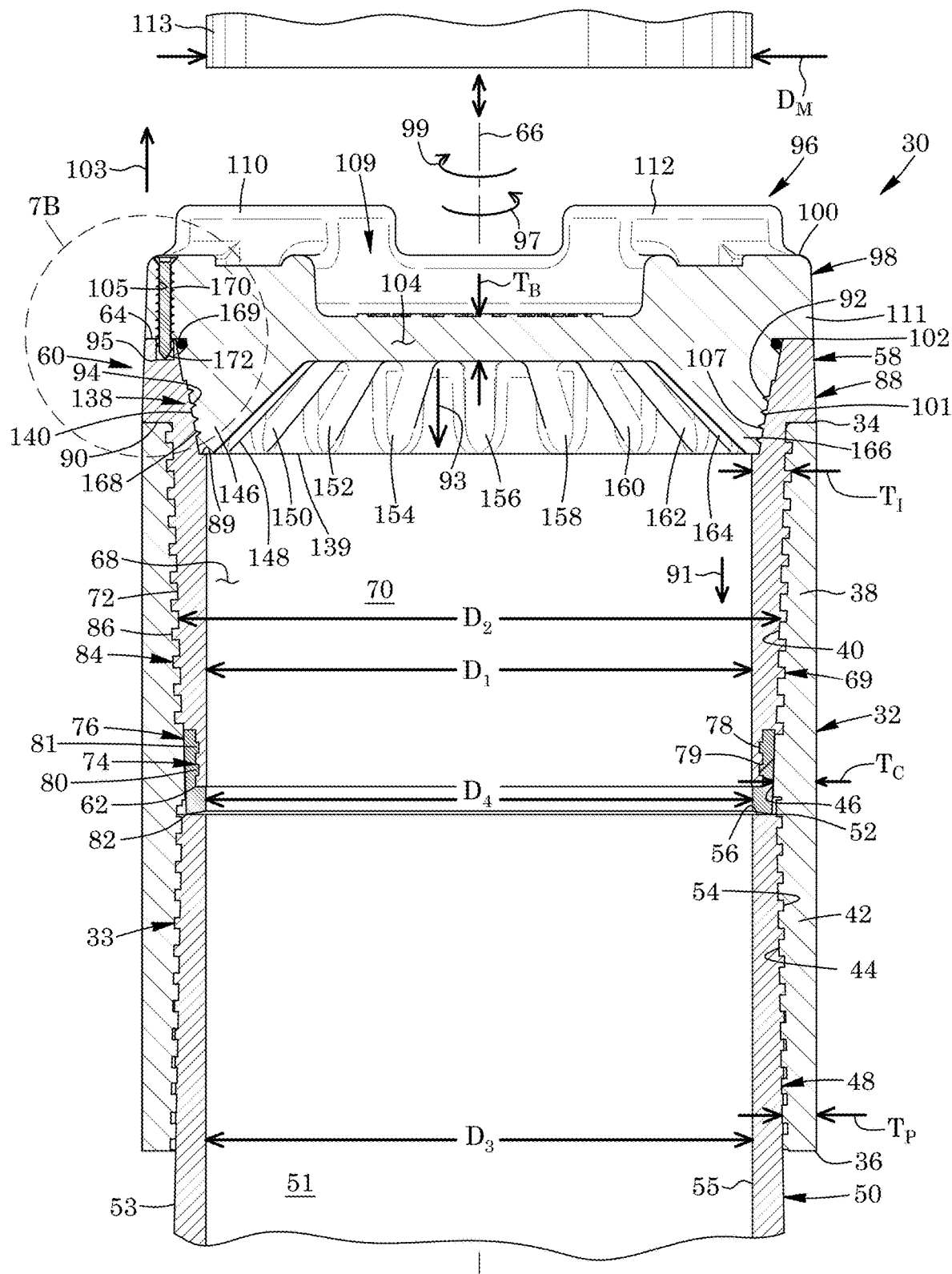
FIG. 7A is a sectional view taken along lines 7A-7A of the pipe protector assembly, pipe coupling and pipe of FIG. 2, with the pipe being shown in fragment.

As seen in FIG. 7A, pipe coupling 32 includes a first female member 38 and a second female member 42 coupled to the first female member thereof. The first and second female members are integrally connected together so as to form a unitary whole in this example. First female member 38 has inner and in this example right-handed threading 40 that extends from outer end 34 of pipe coupling 32 towards inner end 36 of the pipe coupling. Second female member 42 includes inner threading 44 extending from the inner end of the pipe coupling towards the outer end of the pipe coupling. Pipe coupling 32 has an inner surface, in this example an annular inner surface 46 extending between first female member 38 thereof and second female member 42 thereof. Second female member 42 of the pipe coupling is shaped to receive and threadably couple to a male threaded end portion 48 of a conduit, in this example pipe 50.

The pipe encloses an interior 51 and has an exterior 53. Pipe 50 has a first end 52, a second end (not shown) longitudinally spaced from the first end thereof, and threading 54 that extends from the first end thereof towards the second end thereof. The threading of pipe 50 extends along exterior 53 thereof. The pipe has an interior peripheral surface 55 that is outwardly concave and in fluid communication with interior 51 thereof. Pipe 50 has an outer end face 56 that is planar in this example. The outer end face of the pipe aligns with and extends along end 52 of the pipe. Outer end face 56 of pipe 50 is annular in this example and may be referred to as a pipe face or outer end face.

Figure 6:
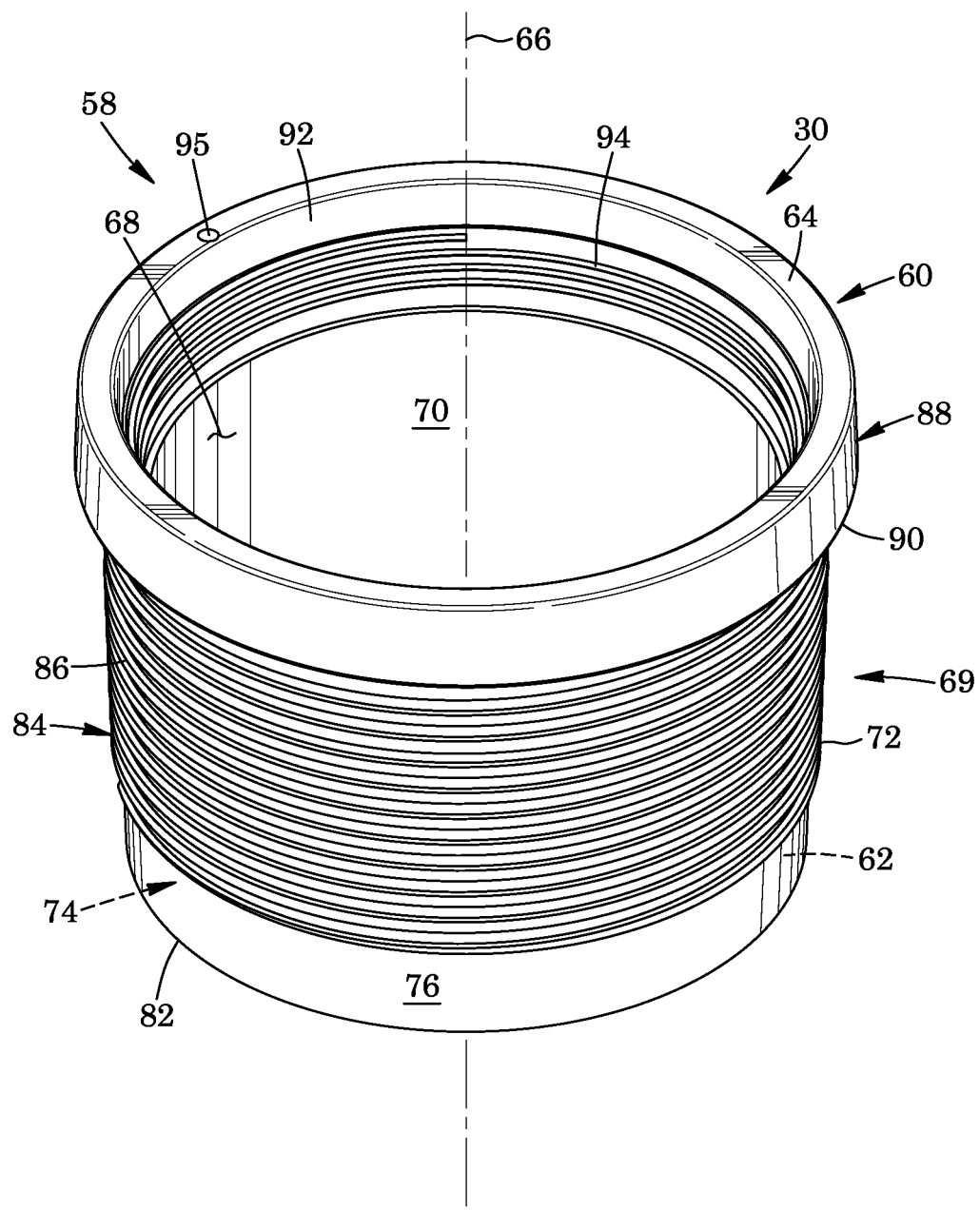
FIG. 6 is an outer end, bottom, left side perspective view of the tubular body and a pipe-end-face seal of the open box protector of FIG. 1.

As seen in FIG. 1, pipe thread protector assembly 30 includes a pipe thread protector, in this example an open box protector 58. As seen in FIG. 7A, the open box protector includes a tubular body 60. The tubular body is shaped to protect right-handed threading 40 of first female member 38 of pipe coupling 32. Tubular body 60 has a first or inner end 62, a second or outer end 64 spaced-apart from the inner end thereof and a longitudinal axis 66 extending between the ends thereof. Referring to FIG. 1, pipe coupling 32 is coaxial with tubular body 60 and extends about axis 66. As seen in FIG. 6, tubular body 60 has an interior 68 extending between and in fluid communication with ends 62 and 64 thereof. The tubular body has an exterior 69 radially spaced from the interior thereof.

The tubular body has an inner surface 70 in fluid communication with the interior thereof. Tubular body 60 has an outer surface 72 radially outwardly spaced from the inner surface thereof. The inner and outer surfaces of the tubular body extend between ends 62 and 64 of tubular body 60. Inner and outer surfaces 70 and 72 of tubular body 60 are curved and tubular in shape in this example.

As seen in FIG. 7A, the tubular body includes a first, proximal or end portion 74 that extends from inner end 62 thereof towards outer end 64 thereof. The end portion of tubular body 60 is sleeve-like in shape. Pipe thread protector assembly 30 includes a first or pipe-end-face seal 76. The seal is softer and more resilient than tubular body 60 and in this example is made of an elastomer. However, this is not strictly required and the seal may be made of other resilient and waterproof materials in other embodiments. Seal 76 is annular in this example and shaped to extend about and couple to end portion 74 of tubular body 60. In this example the seal couples to the end portion of the tubular body via tongues and grooves: in this case the seal includes longitudinally spaced-apart annular tongues 78 and 79 which fit within longitudinally spaced-apart annular grooves 80 and 81 of end portion 74 of the tubular body.

Seal 76 has a distal or inner end portion 82 that is tapered and axially spaced from inner end 62 of tubular body 60. Pipe 50 has an inner diameter $D_3$ and seal 76 has an inner diameter $D_4$. The inner diameter of the seal is equal to the inner diameter of the pipe and not more than $\frac{1}{8}^{th}$ smaller than the inner diameter of the pipe in one example. Seal 76, as well as features, configurations, functionings and variations thereof, are described in more detail in U.S. Provisional Patent Application No. 63/145,766 filed in the United States Patent and Trademark Office on 4 Feb. 2021, the disclosure of which is incorporated herein by reference.

As seen in FIG. 7A, tubular body 60 includes a second, intermediate, central or inner portion 84 that extends radially outwards from end portion 74 thereof. The inner portion of the tubular body is sleeve-like in shape. Inner portion 84 of the tubular body extends from end portion 74 of the tubular body towards outer end 64 of the tubular body. As seen in FIG. 6, the inner portion of tubular body 60 has a first of left-handed and right-handed threading, in this example right-handed threading 86. Inner portion 84 of the tubular body may be referred to as an inner threaded portion. Right-handed threading 86 extends along exterior 69 of tubular body 60, in this example extending radially outwards from outer surface 72 of the tubular body. The right-handed threading 86 of inner portion 84 of tubular body 60 extends from near inner end 62 of the tubular body towards outer end 64 of the tubular body.

Still referring to FIG. 6, the tubular body includes a third, distal or outer portion 88 which couples to inner portion 84 thereof. The outer portion is sleeve-like in shape and may be referred to another or distal end portion of tubular body 60. Outer portion 88 of the tubular body is integrally formed with the inner portion of the tubular body in this example. The outer portion of tubular body 60 extends radially outwards from the inner portion of the tubular body. Outer portion 88 of tubular body 60 extends from outer end 64 of the tubular body towards inner end 62 of the tubular body.

The tubular body has a first or outer shoulder 90 that extends radially between inner portion 84 and outer portion 88 of the tubular body. The shoulder is annular in this example. As seen in FIG. 7A, the inner portion of tubular body 60 tapers in a direction 91 extending from outer shoulder 90 towards inner end 62 of the tubular body in this example. The tubular body may thus be described as open-ended and sleeve-like in shape, with an enlarged first, distal or flanged end portion 88, a radially-inwardly extending second, proximal or tapered end portion 74, and a central portion 84 that tapers in a direction extending from the flanged end portion to the tapered end portion thereof. Inner portion 84 of the tubular body has a cross-sectional thickness $T_1$ adjacent outer portion 88 of the tubular body.

Figure 7B:
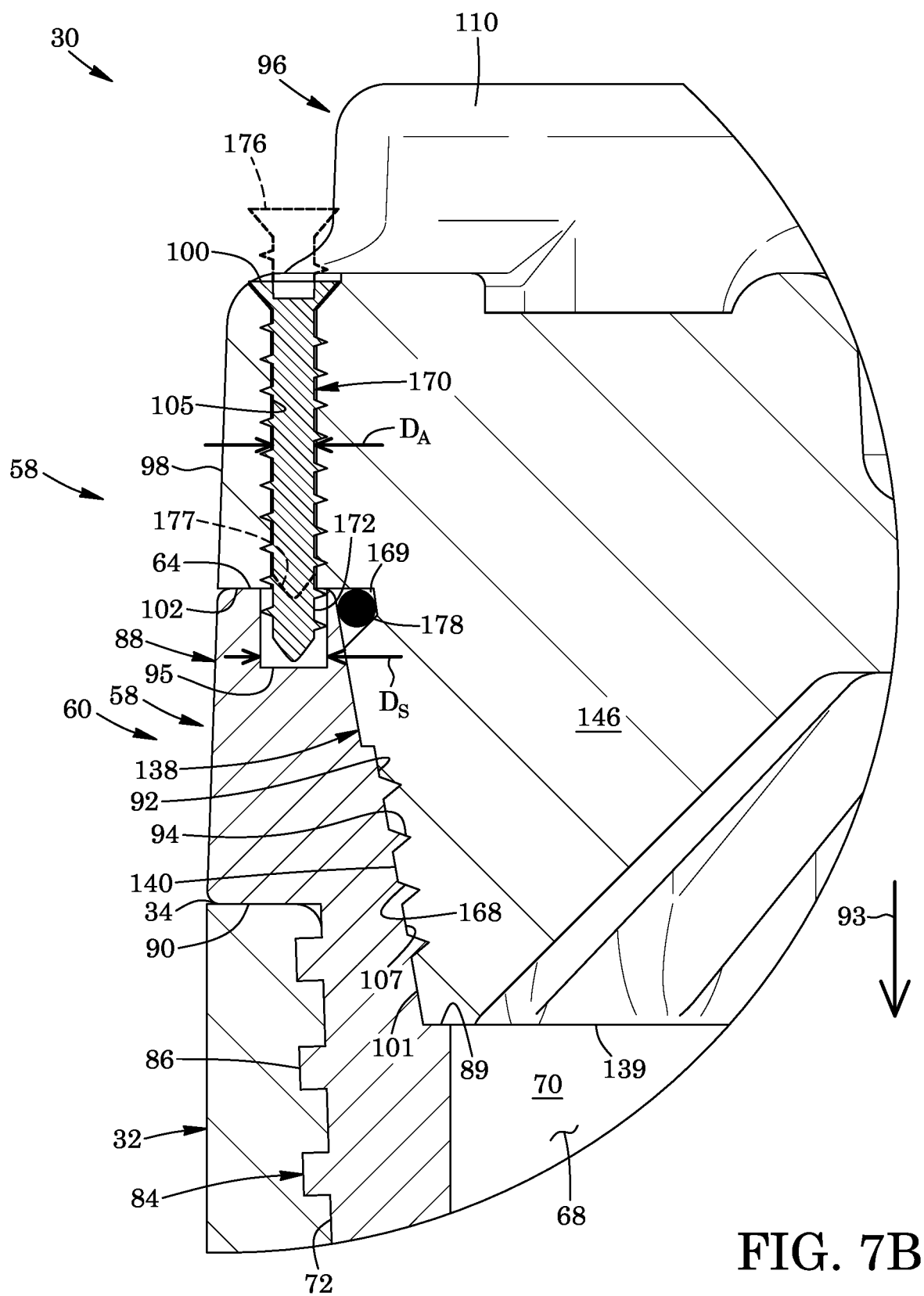
FIG. 7B is an enlarged sectional view taken of the pipe thread protector assembly and coupling of FIG. 7A, with the pipe thread protector assembly and pipe coupling being shown in fragment.
Figure 8:
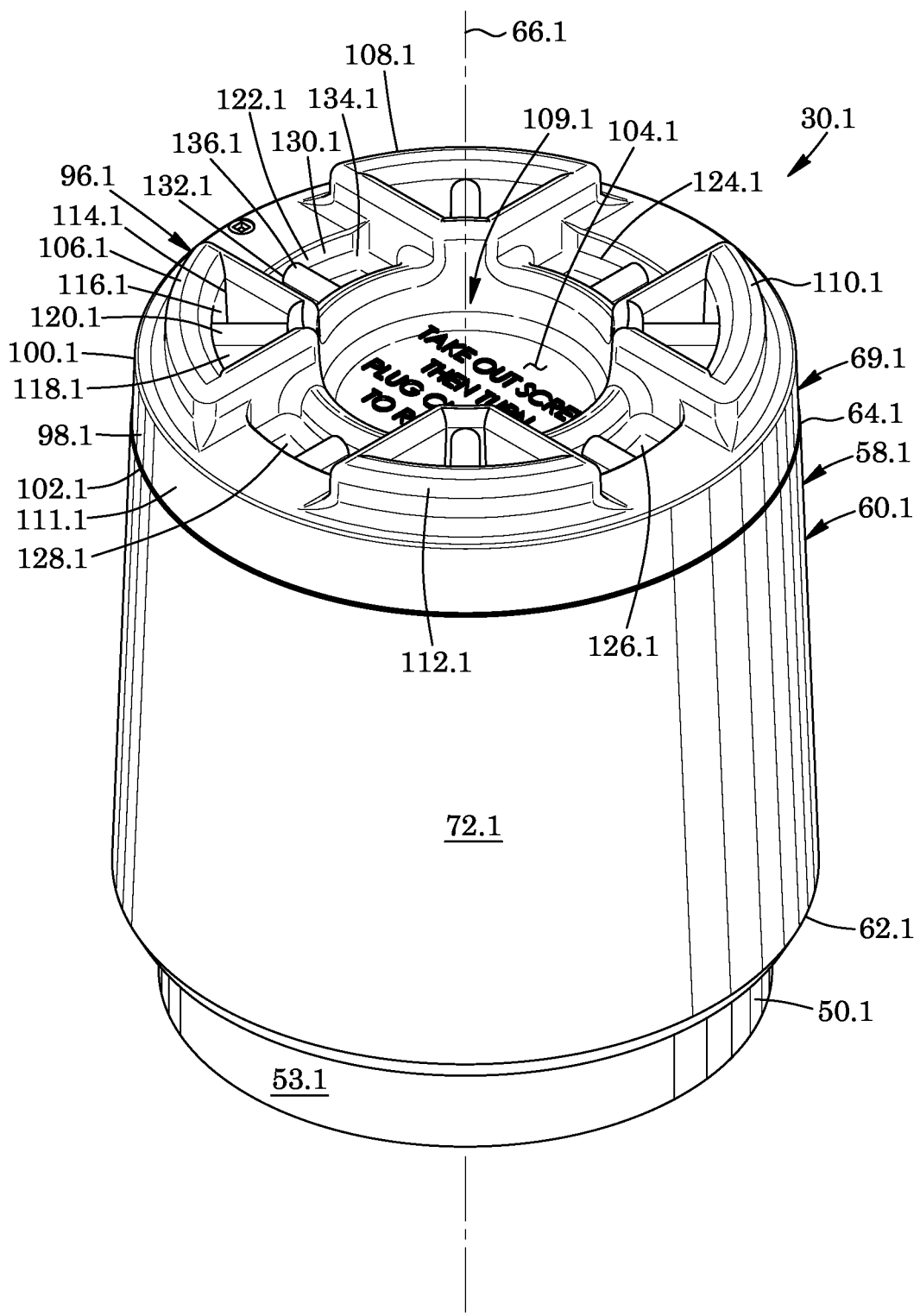
FIG. 8 is an outer end, bottom, left side perspective view of a pipe thread protector assembly according to a second embodiment, together with an end portion of a pipe shown in fragment, the assembly including a pin protector threadably coupled to the end portion of the pipe, with the pin protector comprising a tubular body with a removable end plug threadably coupled to the tubular body thereof.
Figure 9:
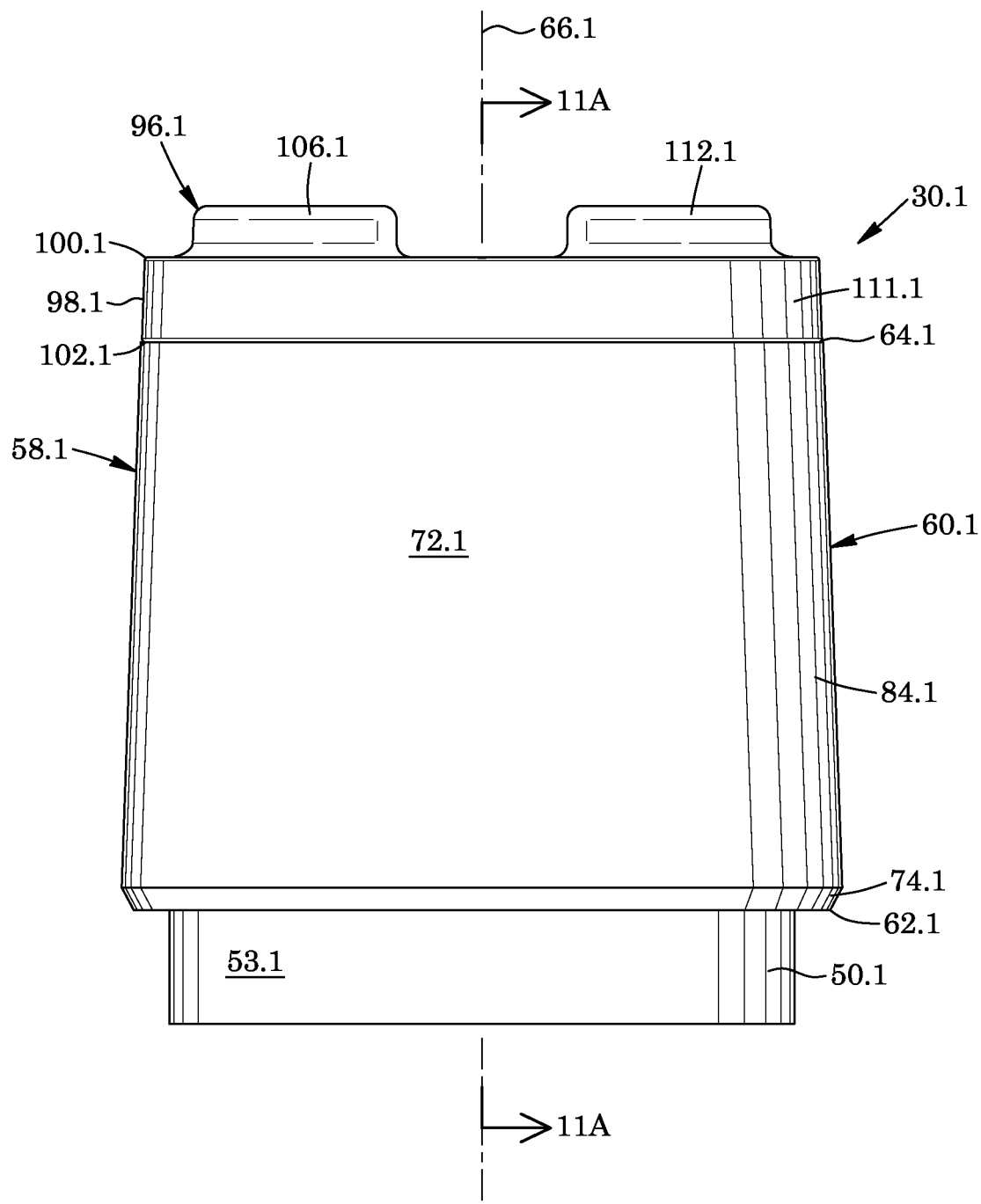
FIG. 9 is a bottom plan view thereof.

As seen in FIG. 7B, tubular body 60 has a second or inner shoulder or seat 89 in fluid communication with interior 68 thereof. However, this is not strictly required and in other embodiments the tubular body may extend continuously from outer end 64 thereof towards inner end 62 thereof without a seat, for example. Seat 89 is planar and annular in this example. The seat extends radially between outer portion 88 of tubular body 60 and inner portion 84 of the tubular body in this example. Seat 89 extends from inner surface 70 of tubular body 60 towards outer surface 72 of the tubular body.

Outer portion 88 of tubular body 60 has a longitudinally-extending recess, in this example a socket 95. The socket extends from outer end 64 of the tubular body towards inner end 62 of the tubular body seen in FIG. 7A. Socket 95 has a diameter $D_S$.

Still referring to FIG. 7A, outer portion 88 of tubular body 60 has a tapered bore 92 and inner surface 107. The bore and inner surface taper in a direction 93 extending from outer end 64 of the tubular body towards inner end 62 of the tubular body. The outer portion of the tubular body is trapezoidal in lateral section in this example, in this case being in the shape of a right-angled trapezoid; however, this is not strictly required. Outer portion 88 of tubular body 60 has a second of right-handed and left-handed threading, in this example left-handed threading 94. The left-handed threading is in fluid communication with tapered bore 92. Left-handed threading 94 extends between outer end 64 and seat 89 of tubular body 60. The left-handed threading extends along and radially inwards from inner surface 107 of outer portion 88 of the tubular body.

First female member 38 of pipe coupling 32 is shaped to receive seal 76 and end portion 74 and inner portion 84 of tubular body 60 of open box protector 58. The first female member is shaped to threadably couple to the inner portion of the tubular body of the open box protector via right-handed threading 40 and 86. Outer end 34 of pipe coupling 32 is configured to abut outer shoulder 90 of tubular body 60 of open box protector 58 when the pipe coupling and open box protector are so threadably coupled together. End portion 82 of seal 76 is positioned adjacent second female member 42 of pipe coupling 32 when the pipe coupling and tubular body 60 of the open box protector are so threadably coupled together. The end portion of the seal is shaped to extend along and cover outer end face 56 of pipe 50 when pipe coupling 32 so threadably connects together the pipe and tubular body 60 of open box protector 58.

As seen in FIG. 1, pipe thread protector assembly 30 includes an end member that is selectively removable and shaped to absorb impacts, in this example a removable, impact-absorbing plug 96. The plug is generally disc-shaped in this case, though this is not strictly required. Plug 96 is coaxial with tubular body 60 and pipe coupling 32 and extends about longitudinal axis 66 of the tubular body. The plug may be manufactured from cost-effective materials, such as high-density polyethylene (HDPE) resin; however, here too this is not strictly required.

As seen in FIG. 7A, plug 96 includes a base member 98 which is generally planar in this example. The base member is shaped to extend laterally across outer end 64 of tubular body 60 of open box protector 58. Base member 98 is annular and disc-shaped in this example. The base member has a first, distal or outer end 100 and a second, proximal or inner end 102 spaced-apart from the outer end thereof. Base member 98 includes an outer peripheral portion 111 that is annular. The outer peripheral portion of the base member is coextensive with outer end 64 of tubular body 60 in this example, though this is not strictly required. Inner end 102 and outer peripheral portion 111 of base member 98 are shaped to extend across and abut the outer end of the tubular body.

Still referring to FIG. 7A, the base member of plug 96 has a central, open-ended chamber 109 and a recessed central portion 104 in fluid communication with the chamber. The chamber and central portion are circular and coaxial with longitudinal axis 66 of tubular body 60 in this example. Open-ended chamber 109 of base member 98 of plug 96 is cylindrical in an outer shape, inwardly concave and open in an upwards-facing direction from the perspective of FIG. 7A in this example. Recessed central portion 104 of the base member of the plug has a thickness $T_B$ equal to or greater than the thickness of tubular body 60 at any region thereof in this example, such as wall thickness TI of inner portion 84 of the tubular body in this example; however, this is not strictly required. Plug 96 thus has a cross-sectional thickness at least in part equal to or greater than that of the tubular body.

Thickness $T_B$ of recessed central portion 104 of base member 98 of plug 96 is equal to or greater than the thickness of pipe coupling 32 at any region thereof in this example, such as wall thickness $T_C$ of the pipe coupling between female members 38 and 42 and adjacent annular inner surface 46 thereof. However, this is not strictly required. Plug 96 thus has a thickness at least in part equal to or greater than that of the pipe coupling. Thickness $T_B$ of recessed central portion 104 of base member 98 of plug 96 is equal to or greater than wall thickness $T_P$ of pipe 50 at any region thereof in this example; however, this is not strictly required. The plug thus has a thickness at least in part equal to or greater than that of the pipe. Plug 96 may therefore be said to have a central portion that is enlarged and thicker relative to the thickness of tubular body 60, pipe coupling 32 and/or pipe 50. The axial thickness of the plug is configured to increase impact performance of the plug.

Still referring to FIG. 7A, base member 98 of plug 96 has an aperture, in this example a threaded aperture 105. The threaded aperture extends therethrough from outer end 100 of the base member to inner end 102 of the base member. Threaded aperture 105 extends through outer peripheral portion 111 of base member 98 of plug 96 and is radially outwardly spaced from longitudinal axis 66 of tubular body 60 and open-ended chamber 109 of the plug. As seen in FIG. 7B, the threaded aperture has a diameter DA. The diameter of threaded aperture 105 is less than diameter $D_S$ of socket 95 in this example.

Figure 4:
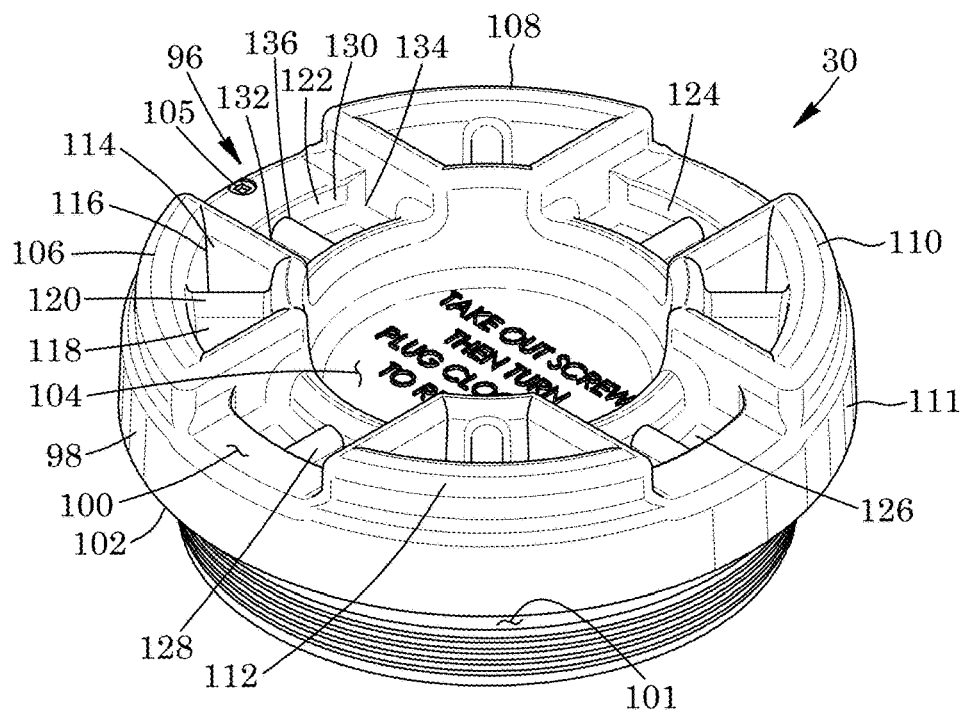
FIG. 4 is an outer end, bottom, left side perspective view of the end plug of the open box protector of FIG. 1.

As seen in FIG. 4, plug 96 includes one or more protuberances, in this example a plurality of bumpers 106, 108, 110 and 112. The bumpers couple to and extend longitudinally outwards from outer end 100 of base member 98 of the plug. Bumpers 106, 108, 110 and 112 are integrally formed with the base member of plug 96 in this example. The bumpers are circumferentially spaced-apart in this example. Each bumper is arc-shaped in top plan view. Bumpers 106, 108, 110 and 112 are recessed so that a series of open pin or box protectors may be stackable together. In this example, each bumper has an open top 114, at least one and in this example a pair of chambers 116 and 118 in fluid communication with the open top thereof, and a rib 120 extending between the chambers thereof. However, this is not strictly required. Chambers 116 and 118 are arc-shaped sub-portions that are generally triangular in end view in this example; however here too this is not strictly required. The bumpers so shaped and recessed may function to minimize the prospects of pin or box protectors knocking together and coming loose during handling.

Still referring to FIG. 4, plug 96 is recessed at least in part to enable a pipe wrench (not shown) or flat bar (not shown) to selectively fit therein and couple with the plug for installation or removal of the plug. To this end and in this example base member 98 of plug 96 has a plurality of peripheral recessed portions 122, 124, 126 and 128. The peripheral recessed portions are adjacent to and extending circumferentially about recessed central portion 104 thereof in this example. Peripheral recessed portions 122, 124, 126 and 128 are positioned between respective ones of bumpers 106, 108, 110 and 112. Each peripheral recessed portion 122 of base member 98 of plug 96 is rectangular in top view, with an open top 130, at least one and in this example a pair of chambers 132 and 134 in fluid communication with the open top thereof, and a rib 136 extending between the chambers thereof. However, this is not strictly required. Bumpers 106, 108, 110 and 112 extend outwards and upwards from peripheral recessed portions 122, 124, 126 and 128 of base member 98 of plug 96 in this example and from the perspective of FIG. 4. In addition to facilitating installation and removal of plug 96, the peripheral recessed portions of the base member of the plug may further aid in the manufacturing process.

Referring to FIG. 7A, plug 96 includes an inner portion 138 coupled to and extending outwards from base member 98 thereof. The inner portion of the plug extends longitudinally inwards and downwards from the base member from the perspective of FIG. 7A. Inner portion 138 of plug 96 is integrally formed with base member 98 of the plug so as to form a unitary whole in this example. The inner portion of the plug is generally annular in shape. Inner portion 138 of plug 96 is frustoconical in outer shape in this example.

The inner portion of the plug includes an inner annular member 140 coupled to and extending longitudinally from inner end 102 of base member 98 of plug 96. The inner annular member tapers in direction 91 extending from the inner end of the base member towards inner end 62 of tubular body 60.

Figure 5:
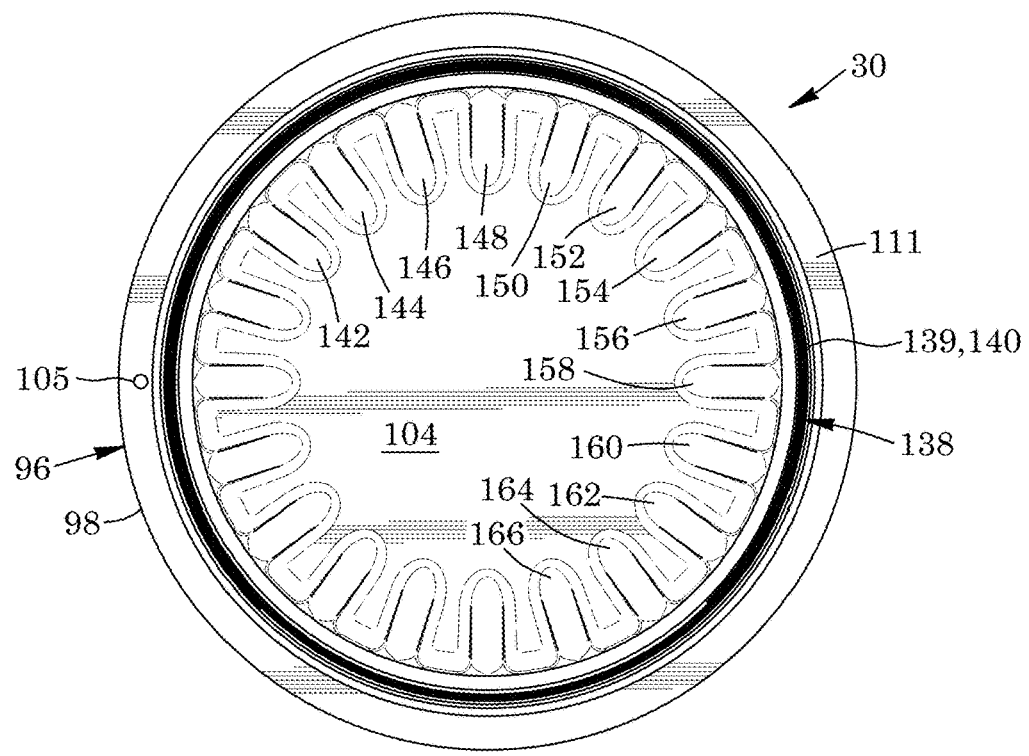
FIG. 5 is an inner end elevation view thereof.

As seen in FIG. 5, inner portion 138 of plug 96 comprises a plurality of circumferentially spaced-apart brace or supporting members, in this example including supporting ribs 142, 144, 146, 148, 150, 152, 154, 156, 158, 160, 162, 164 and 166. The As seen in FIG. 7A, the ribs couple to and extend radially inwards from inner annular member 140 of the inner portion of the plug. Ribs 146, 148, 150, 152, 154, 156, 158, 160, 162, 164 and 166 couple to and extend longitudinally inwards and downwards from base member 98 of plug 96 in this example and from the perspective of FIG. 7A. The ribs are integrally formed with the base member and inner annular member 140 of inner portion 138 of the plug so as to form a unitary whole in this example. Each supporting rib 146, 148, 150, 152, 154, 156, 158, 160, 162, 164 and 166 thus extends radially in part and longitudinally in part. Each rib is a triangular prism in shape in this example; however this is not strictly required. Ribs 146, 148, 150, 152, 154, 156, 158, 160, 162, 164 and 166 are shaped to increase impact performance of plug 96 and inhibit the plug from being deformed as a result of outside impact forces.

As seen in FIG. 5, inner annular member 140 of inner portion 138 of plug 96 has an inner end 139 that is planar in this example. The inner end is annular and may be referred to as an inner or proximal end of the plug. As seen in FIG. 7A, inner annular member 140 of inner portion 138 of plug 96 has an outer surface 101 that extends from inner end 102 of base member 98 of the plug to inner end 139 of the inner portion of the plug. The outer surface is annular and outwardly convex in this example. Outer surface 101 tapers in direction 91 extending from inner end 102 of base member 98 of plug 96 to inner end 139 of inner portion 138 of the plug in this example. The inner portion of the plug includes the second of right-handed and left-handed threading, in this example left-handed threading 168. The left-handed threading extends along and radially-outwards from the outer surface 101 of inner portion 138 of plug 96. Left-handed threading 168 is positioned between inner end 102 of base member 98 of the plug and inner end 139 of the inner portion of the plug in this example Still referring to FIG. 7A, inner annular member 140 of inner portion 138 of plug 96 is shaped to be received in part within tapered bore 92 of outer portion 88 of tubular body 60, with inner end 139 of the inner portion of plug abutting seat 89 of the tubular body. However, as mentioned the seat is not strictly required and the inner end of the inner portion of the plug thus need not abut with a seat. Plug 96 is shaped to removably couple to and extend laterally across tubular body 60. In this example, the plug threadably couples to the tubular body; however, this is not strictly required and the plug may removably couple to the tubular body in other manners in other embodiments. Referring to FIG. 7B, inner annular member 140 of inner portion 138 of plug 96 threadably couples to and is selectively removable from outer portion 88 of tubular body 60 via left-handed threading 94 and 168. As seen in FIG. 7B, threaded aperture 105 of the plug is configured to align and be coaxial with socket 95 when the plug and tubular body are fully threadably coupled together.

Still referring to FIG. 7B, inner annular member 140 of inner portion 138 of plug 96 has an annular groove 169. The annular groove is adjacent inner end 102 of base member 98 in this example. Annular groove 169 extends radially inwards from outer surface 101 of inner annular member 140 of inner portion 138 of plug 96. The annular groove is trapezoidal in lateral section in this example, in this case being in the shape of a right-angled trapezoid; however, this is not strictly required. Annular groove 169 is longitudinally spaced outwards and upwards from left-handed threading 168 from the perspective of FIG. 7B. The annular groove is also radially outwardly-spaced from the left-handed threading in this example. Annular groove 169 of inner annular member 140 of inner portion 138 of plug 96 is positioned adjacent to and aligns with socket 95 in this example. The annular groove is radially inwardly spaced from the socket in this example.

Still referring to FIG. 7B, open box protector 58 includes a locking member, in this example a threaded member, in this case a fastener in the form of a locking screw 170. The locking screw threadably couples to plug 96 via threaded aperture 105. As seen in FIG. 7B, the locking screw has a distal end portion 172 that is selectively extendable within socket 95 of tubular body 60 of open box protector 58. The socket is thus shaped to receive a threaded member or fastener in part. In this example socket 95 is shaped to receive but avoid threaded engagement with the end portion of locking screw 170. End portion 172 of locking screw 170 thus loosely fits within socket 95 and the socket is larger in span than the end portion of the locking screw. Locking screw 170 has a first or locked position, shown in solid lines in FIG. 7B, in which the end portion of the locking screw extends within socket 95. Removal of plug 96 from tubular body 60 is inhibited when the locking screw is in the locked position, as the locking screw so positioned inhibits rotation of the plug relative to the tubular body.

Locking screw 170 is moveable from the locked position thereof to a second or unlocked position, seen in dotted lines and numerals 176 and 177 in FIG. 7B. The unlocked position of the locking screw may be referred to as an at least partially unthreaded position of the locking screw. End portion 172 of locking screw 170 is longitudinally spaced outwards from and is thus no longer in socket 95 when the locking screw is in the unlocked position. The locking screw so positioned clear of the socket enables plug 96 to be rotated relative to tubular body 60. The plug is thus selectively removable from the tubular body in the unlocked position of locking screw 170. Plug 96 is also fully threadably connectable with tubular body 60 when the locking screw is in its unlocked position.

In operation and referring to FIG. 7A, plug 96 thus threadably couples with open box protector 58 by means of left-handed threading 94 and 168, with the plug being rotated to this end in a first or left-hand direction of rotation, in this example a counter-clockwise direction 97. Locking screw 170 is then fully threaded through the plug and into socket 95 of the open box protector to lock the plug and tubular body 60 together and inhibit rotation of one relative to the other. Open box protector 58 and plug 96 may then be shipped to a pipe fabricator. The pipe fabricator may then install or threadably connect the open box protector and plug so coupled together, to first female member 38 of pipe coupling 32 seen via right-handed threading 40 and 86. Tubular body 60 is thus installed on the pipe coupling by turning tubular body 60 and plug 96 so coupled together in the conventional second or right-hand direction of rotation, in this example a clockwise direction 99. Although plug 96 has left-handed threading 168, the plug will remain in place during installation of box protector 58 onto pipe coupling 32 due to the presence of locking screw 170 in the locked position, which inhibits movement of the plug relative to tubular body 60 of open box protector 58.

When the pipe fabricator or driller wants the plug removed and the open box protector to remain on pipe coupling 32, locking screw 170 is partially unscrewed or backed off so as to cause the screw to move upwards as shown by arrow 103 and out of socket 95. Plug 96 is next turned via bumpers 110 and 112 in clockwise direction 99. This will cause the plug to be threadably removed from open box protector 58 without also unscrewing and removing open box protector 58 from pipe coupling 32. Plug 96 may then be recycled or reinstalled onto the open box protector after the drifting process at the discretion of the pipe fabricator or driller. Referring to FIG. 7A, drifting may involve testing the inner diameter $D_3$ of the pipe using a cylindrical member, in this example mandrel 113 having an outer diameter $D_M$. Plug 96 is removed and the mandrel is thereafter is inserted through tubular body 60, pipe coupling 32 and into pipe 50 to test the inner diameters of the same. Outer diameter $D_M$ of mandrel 113 should be equal to or less than the diameter $D_3$ of pipe 50. Drifting and mandrels per se are known to those skilled in the art and will not be described in further detail.

Tapered surfaces 101 and 107, where the plug contacts open box protector 58, provide a snug fit therebetween. This may provide structural support to pipe thread protector assembly 30. Tapered surfaces 101 and 107 may further aid in installation of plug 96 and removal thereof, even if the pipe thread protector assembly has been subjected to a high impact force. In addition and referring to FIG. 7A, the plug as herein described is shaped to protect the open box protector 58 (including functioning to promote and maintain a consistent inner diameter $D_1$ thereof) and as well pipe coupling 32 (at least including functioning to promote and maintain a consistent inner diameter $D_2$ of first female member 38 thereof) from damage caused from impact.

Pipe thread protector assembly 30 as herein described may thus be said to comprise a two-piece protector assembly containing an impact-absorbing plug 96 that may be readily removed from box protector 58 just prior to drifting. The plug as herein described may increase in impact protection for the steel connection comprising the first female member of pipe coupling 32. Plug 96 is shaped to maintain contact with outer end 64 of protector 58 and provide the otherwise open box protector with structural support, allowing the protector to maintain its inner drift diameter even when subjected to high impact forces.

As seen in FIG. 7B, open box protector 58 includes a second or plug seal 178. The plug seal is positioned between tubular body 60 and plug 96. Plug seal 178 is softer and more resilient than the plug and tubular body and in this example is made of an elastomer. However, this is not strictly required and the seal may be made of other resilient and waterproof materials in other embodiments. Plug seal 178 is annular and circular in cross-section in this example, in this case comprising an O-ring; however this is not strictly required. The plug seal aligns adjacent outer end 64 of the tubular body and is shaped to be received within annular groove 169 of inner portion 138 of the plug. Plug seal 178 is thus positioned adjacent to socket 95 of tubular body 60 and end portion 172 of locking screw 170 in this example. Referring to FIG. 7A, the plug seal, so positioned between plug 96 and open box protector 58, is configured to inhibit water or other contaminates from entering within interior 68 of tubular body 60 and thus within interior 51 of threaded pipe 50 during handling, transportation, and storage. The plug may thus function to seal the inside of pipe 50 from the environment.

There is thus provided a method of transporting and drifting a pipe using the pipe thread protector assembly 30 as herein described. As seen in FIG. 7A, the method includes coupling together tubular body 60 and plug 96 of the pipe thread protector assembly. The method may include moving locking screw 170 into the locked position thereof in which removal of the plug from the tubular body is inhibited. The method includes threadably connecting tubular body 60 and plug 96 so coupled together to pipe coupling 32 which couples to threaded end portion 48 of pipe 50, with debris being inhibited from contacting outer end face 56 and interior 51 of the pipe thereby. The method includes transporting the pipe, with the tubular body and the plug so coupled thereto, to a work site.

The method includes drifting pipe 50 by removing plug 96 from tubular body 60 so coupled to pipe coupling 32. Within this removal step, the method may include moving locking screw 170 from the locked position to the unlocked position in which the plug is selectively removable from the tubular body. The method thereafter includes biasing mandrel 113 having pre-determined outer diameter $D_M$ through the tubular body and into the pipe. The method includes determining that the pipe is acceptable if the mandrel extends therein, and determining that the pipe is unacceptable if the cylindrical member is inhibited from extending therein. The method may further include after the biasing step, re-connecting plug 96 to tubular body 60, with debris being inhibited from contacting end face 56 and interior 51 of pipe 50 once more.

FIGS. 8 to 11B show a pipe thread protector assembly 30.1 according to another embodiment. Like parts have like numbers and functions as the pipe thread protector assembly 30 shown in FIGS. 1 to 7B with the addition of decimal extension "0.1". Pipe thread protector assembly 30.1 is substantially the same as pipe thread protector assembly 30 shown in FIGS. 1 to 7B with at least the following exceptions.

Figure 10:
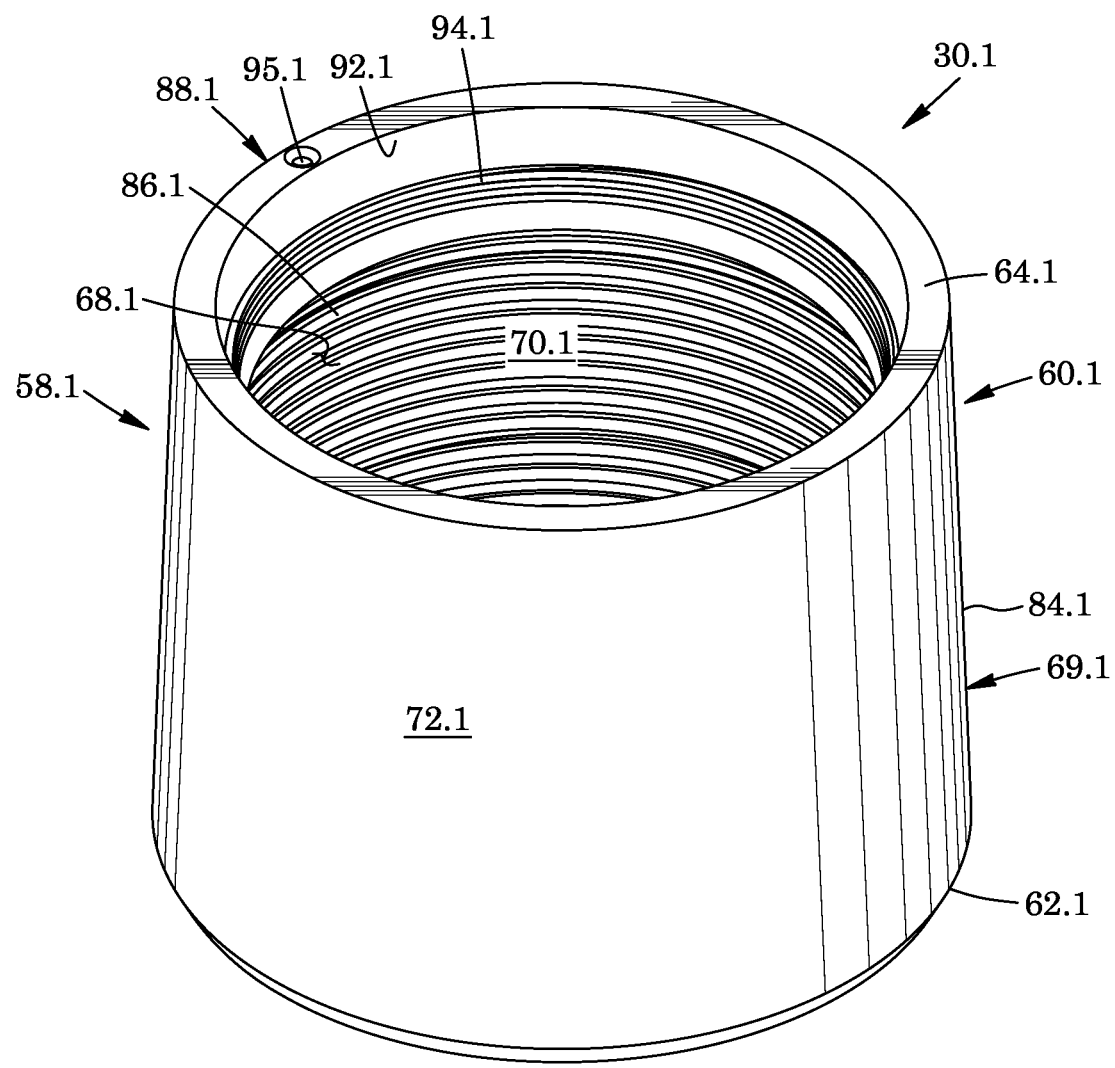
FIG. 10 is an outer end, bottom, left side perspective view of the tubular body of the pin protector of FIG. 8.
Figure 11A:
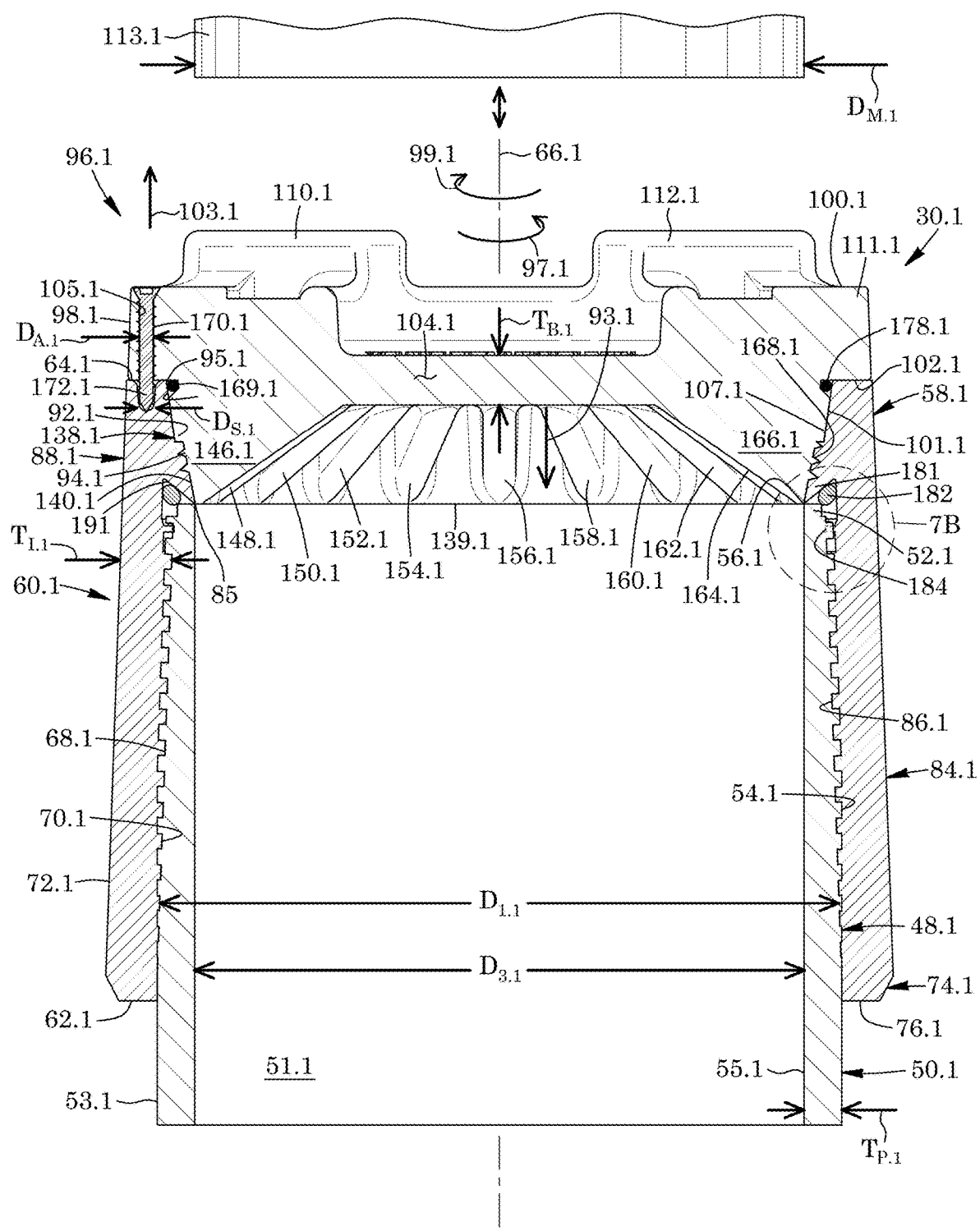
FIG. 11A is a sectional view taken along lines 11A-11A of the pipe thread protector assembly and pipe of FIG. 9, with the pipe being shown in fragment.

As seen in FIG. 11A, pipe thread protector assembly 30.1 includes a pipe thread protector in the form of an open pin protector 58.1. Tubular body 60.1 of open pin protector 58.1 has a first of left-handed and right-handed threading, in this example right-handed threading 86.1 extending along inner surface 70.1 thereof. The right-handed threading is in fluid communication with interior 68.1 of the tubular body. Right-handed threading 86.1 extends from adjacent inner end 62.1 of tubular body 60.1 towards outer end 64.1 of the tubular body. As seen in FIG. 10, outer surface 72.1 of the tubular body is smooth and outwardly convex in this example. Referring to FIG. 11A, tubular body 60.1 (including the outer surface thereof) tapers from end 62.1 thereof towards end 64.1 thereof. The tubular body is shaped to threadably couple directly to and protect threaded end portion 48.1 of pipe 50.1 via right-handed threading 86.1 of the tubular body and right-handed threading 54.1 of pipe 50.1.

Plug 96.1 is substantially the same as plug 96 seen in FIG. 4 and may be interchangeable between open box protector 58 seen in FIG. 6 and open pin protector 58.1 seen in FIG. 10. Plug 96.1 seen in FIG. 11A is configured to protect open pin protector 58.1 (including functioning to promote and maintain a consistent inner diameter $D_{1.1}$ thereof), pipe 50.1 (including functioning to promote and maintain a consistent inner diameter $D_{3.1}$ thereof, and outer end face 56.1 of the pipe.

As seen in FIG. 11A, outer portion 88.1 of tubular body 60.1 has an inner end 85 longitudinally spaced from outer end 64.1 of the tubular body. Inner surface 107.1 of the tubular body extends between the inner end of the outer portion of the tubular body and the outer end of the tubular body. Inner end 85 of outer portion 88.1 of tubular body 60.1 at least aligns with or extends radially inwards from inner surface 55.1 of pipe 50.1. The inner end of the outer portion of the tubular body is shaped to abut and/or be adjacent to outer end face 56.1 of the pipe when the pipe is fully threadably coupled to tubular body 60.1. Inner end 85 of outer portion 88.1 of tubular body 60.1 aligns with inner end 139.1 of inner portion 138.1 of plug 96.1 in this example when the plug is fully threadably coupled to the tubular body.

Tubular body 60.1 has an inner region, in this example an inner peripheral portion 181. The inner peripheral portion is adjacent inner end 85 of outer portion 88.1 of the tubular body. Inner peripheral portion 181 of tubular body 60.1 is annular. The inner peripheral portion of the tubular body tapers in this example in direction 93.1 extending from outer end 64.1 of the tubular body to inner end 85 of the tubular body.

Inner peripheral portion 181 is defined by a pair of annular surfaces which taper in direction 93.1: in this example inner surface 107.1 of outer portion 88.1 of tubular body 60.1 and slanted surface or shoulder 191 of the tubular body. The inner surface and slanted shoulder meet at end 85 and flare longitudinally and radially outwards therefrom in a longitudinally outwards and upwards direction from the perspective of FIG. 11B in this example. Inner surface 107.1 is angled relative to slanted shoulder 191 by an angle β that is acute in this example. The slanted shoulder of tubular body 60.1 extends longitudinally and radially inwards from inner surface 70.1 of the tubular body to inner end 85 of outer portion 88.1 of the tubular body. Inner peripheral portion 181 of the tubular body is triangular in lateral cross-section in this example. The inner peripheral portion is shaped at least in part to cover, be adjacent to and/or abut outer end face 56.1 of pipe 50.1 when the pipe is fully threadably coupled to tubular body 60.1.

Figure 11B:
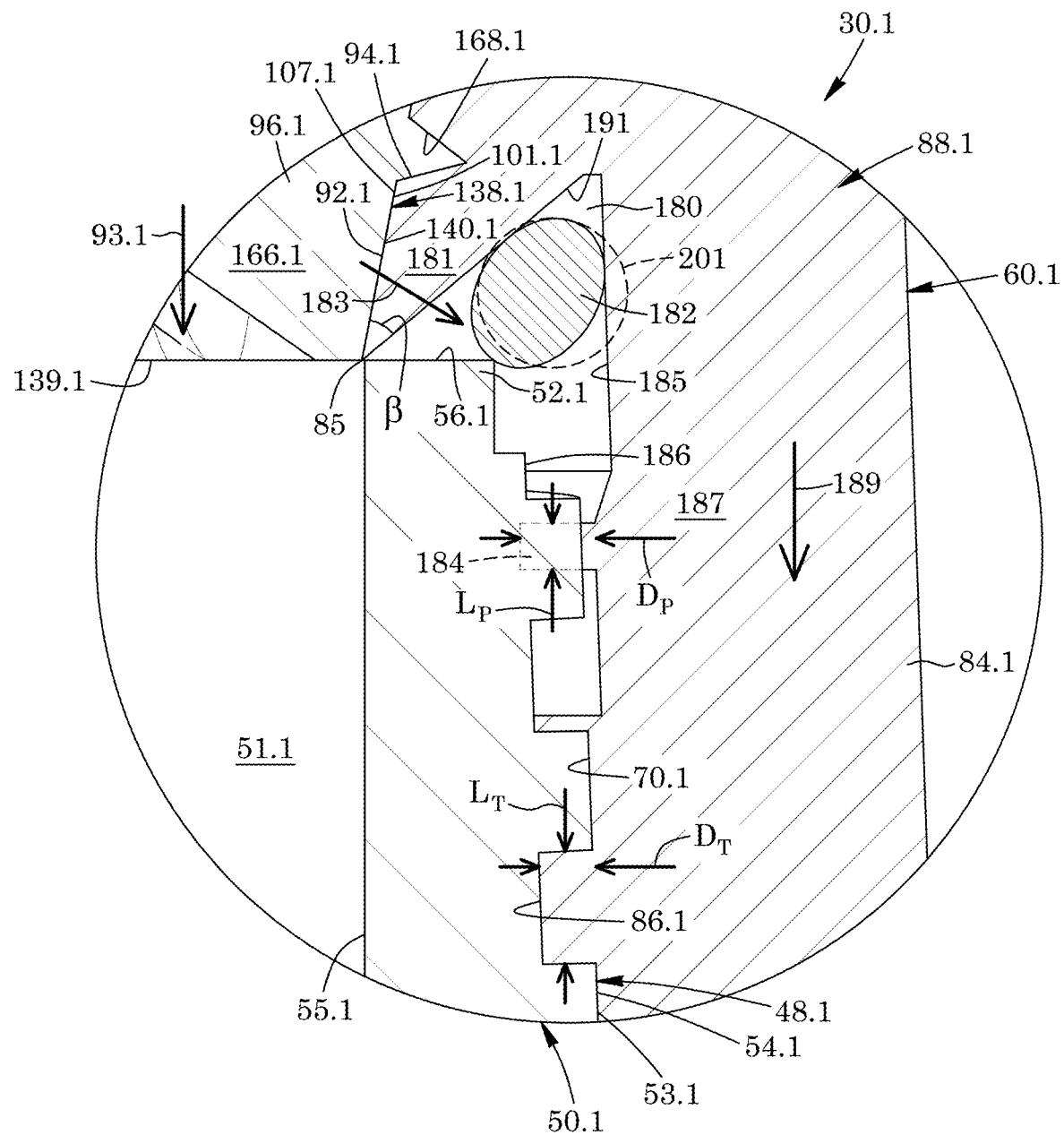
FIG. 11B is an enlarged sectional view taken of the pipe thread protector assembly and pipe of FIG. 11A, with the pipe thread protector assembly and pipe being shown in fragment.
Figure 12:
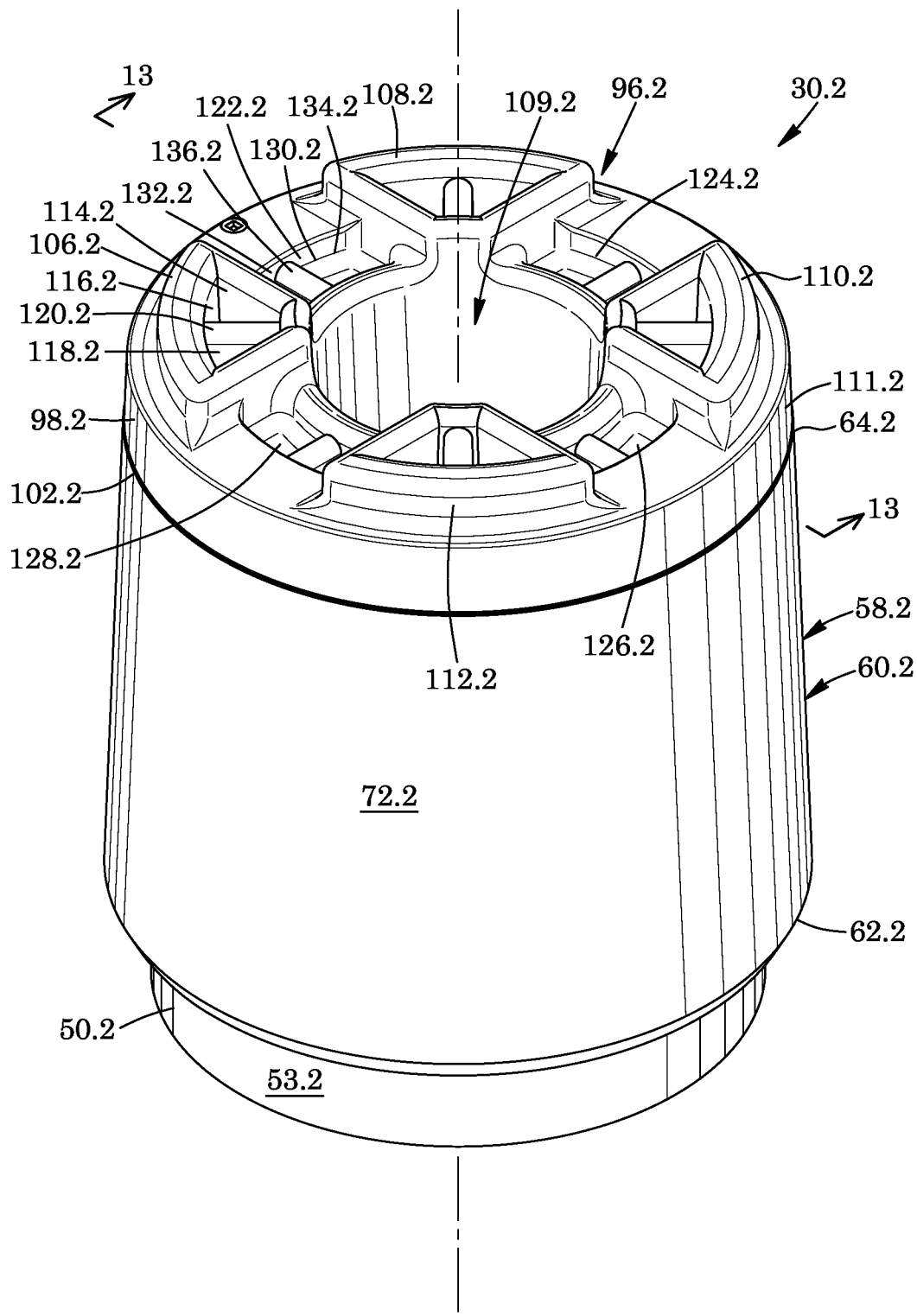
FIG. 12 is an outer end, bottom, left side perspective view of a pipe thread protector assembly according to a third embodiment, together with an end portion of a pipe shown in fragment, the assembly including a pin protector threadably coupled to the end portion of the pipe, with the pin protector comprising a tubular body with a removable end plug threadably coupled to the tubular body thereof.

As seen in FIG. 11B, tubular body 60.1 of open pin protector 58.1 has an annular and tapered groove 180. The groove extends radially outwards relative to bore 92.1, relative to inner end 85 of outer portion 88.1 and relative to inner peripheral portion 181 of the tubular body. Groove 180 also extends axially or longitudinally outwards and upwards from the inner end of the outer portion of the tubular body from the perspective of FIG. 11A and towards outer end 64.1 of tubular body 60.1. Referring back to FIG. 11B, the groove is triangular in lateral cross-section in this example, in this case in the form of a right-angled triangle; however, this is not strictly required. Groove 180 is enclosed in part by and in fluid communication with outer end face 56.1 of pipe 50.1 when the pipe is fully threadably coupled to tubular body 60.1.

Still referring to FIG. 11B, pipe thread protector assembly 30.1 includes a seal 182 positioned within groove 180. The seal is shaped to be larger in lateral section or extent compared to the groove in this example. Seal 182 is annular and circular in lateral cross-section in an uncompressed state (as shown in dotted lines 201) in this example in the form of an O-ring; however, this is not strictly required and the seal may comprise other shapes in lateral cross-section in other examples. Seal 182 is softer and more resilient than tubular body 60.1 and in this example is made of an elastomer. However, this is not strictly required and the seal may be made of other resilient and waterproof materials in other embodiments. Seal 182 is positioned to align with and abut distal end 52.1 of pipe 50.1 and inner peripheral portion 181 of tubular body 60.1 when the pipe is fully threadably coupled with the tubular body.

As seen in FIG. 11B, the seal is shaped to cover outer end face 56.1 of the pipe at least in part. This, together with the inner peripheral portion of the tubular body, are shaped and function to inhibit water or other contaminates from entering right-handed threading 54.1 of male threaded pipe 50.1 when plug 96.1 is removed. Seal 182 and inner peripheral portion 181 of tubular body 60.1 are also configured and function to inhibit water/contaminates from contacting outer end face 56.1 of the pipe. Protection of the pipe face is important because it creases a metal-to-metal seal on the pipe face of the next pipe. The seal may be referred to as a pipe end-face seal. Seal 182 aligns adjacent inner end 139.1 of inner portion 138.1 of plug 96.1 in this example.

Groove 180 and inner peripheral portion 181 of tubular body 60.1 are shaped to keep deformation of seal 182 away from interior 51.1 of pipe 50.1, as shown by arrow of numeral 183. The inner peripheral portion of the tubular body is shaped to compress the seal between the inner peripheral portion of the tubular body and outer end face 56.1 of the pipe in a radially outwards and longitudinally inwards or downwards direction in this example and from the perspective of FIG. 11B. This may ensure that seal 182 does not extend out towards the inside of pipe 50.1 and possibly interfere with the drifting process. Groove 180, inner peripheral portion 181 and slanted shoulder 191 are thus shaped to inhibit deformation of the seal into the interior of the pipe. Tubular body 60.1 so shaped (including inner wall 187 thereof) may function to further promote compression of seal 182, thereby inhibiting water and other contaminates from contacting outer end face 56.1 and interior 51.1 of pipe 50.1. The seal is oval-shaped in its compressed state in this example.

Referring to FIG. 11A, open pin protector 58.1 thus includes a pair of annular, longitudinally spaced-apart seals 178.1 and 182. The seals are positioned between tubular body 60.1 and plug 96.1 and positioned between the tubular body and end portion 48.1 of pipe 50.1, respectively.

As seen in FIG. 11B, open pin protector 58.1 includes an interference-fit protrusion, in this example an interference ring 184. The interference ring is coupled to and extends radially inwards from inner surface 70.1 of tubular body 60.1 adjacent threading 86.1 of the tubular body. Interference ring 184 is annular and rectangular in longitudinal section in this example; however, this is not strictly required. The interference ring has a longitudinally-extending length $L_P$ which is less than the longitudinally-extending length $L_T$ of right-handed threading 86.1 of inner portion 84.1 of tubular body 60.1 in this example.

The threading extends radially inwards a distance DT from inner surface 70.1 of the tubular body. Interference ring 184 extends radially/laterally inwards a distance $D_P$ from inner surface 70.1 of tubular body 60.1. Distance $D_P$ of the interference ring is greater than distance DT of threading 86.1 in this example. Interference ring 184 is positioned to align near distal end 52.1 of pipe 50.1 and groove 180 of tubular body 60.1 in this example. Seal 182 is positioned between slanted shoulder 191 of the tubular body 60.1 and interference ring 184 in this example. The seal is adjacent to and positioned in place at least in part via the interference ring. As seen in FIG. 11A, seal 182 is thus positioned between interference ring 184 and outer end 64.1 of tubular body 60.1.

Referring back to FIG. 11B, the interference ring is configured to deform upon tubular body 60.1 rotatably coupling to threaded end portion 48.1 of pipe 50.1. The interference ring is made of a material configured to deform when rotatably engaging with the pipe. Interference ring 184 so deformed inhibits removal of the pipe from the tubular body thereafter. The interference ring thus is cut into by a distal or outermost thread portion 186 of threading 54.1 of pipe 50.1. Interference ring 184 deformably couples to the outermost thread portion of the pipe. The interference ring is positionable adjacent to outermost thread portion 186 of pipe 50.1 in this example when the pipe and tubular body 60.1 are fully threadably coupled together.

Still referring to FIG. 11B, when pipe thread protector assembly 30.1 is installed by the pipe fabricator, outer end 52.1 of male threaded pipe 50.1 thus makes contact with interference ring 184 located adjacent inner end 185 of inner wall 187 of open pin protector 58.1. The interference ring functions as a frictional lock. When installation torque is applied to pipe thread protector assembly 30.1, male threaded pipe 50.1 contacts interference ring 184 as protector 58.1 screws down, as shown by arrow 189, causing the interference ring to deform. This deformation provides friction and adds resistance to the open pin protector, thus inhibiting the open pin protector from unscrewing itself from pipe 50.1 inadvertently. The amount of frictional resistance interference ring 184 provides to the protector may be determined by width/distance $D_P$ and depth/length $L_P$ of the interference ring. The interference ring may further function as an edge or seat to hold seal 182 in place.

There is thus provided a method of transporting and drifting a pipe using the pipe thread protector assembly 30.1 as herein described. As seen in FIG. 11A, the method includes coupling together tubular body 60.1 and plug 96.1 of the pipe thread protector assembly. The method may include moving locking screw 170.1 into the locked position thereof in which removal of the plug from the tubular body is inhibited. The method includes threadably connecting tubular body 60.1 and plug 96.1 so coupled together to threaded end portion 48.1 of pipe 50.1, with debris being inhibited from contacting outer end face 56.1 and interior 51.1 of the pipe thereby. The method includes transporting the pipe, with the tubular body and the plug so coupled thereto, to a work site.

The method includes drifting pipe 50.1 by removing plug 96.1 from tubular body 60.1 so coupled to the pipe. Within this removal step, the method may include moving locking screw 170.1 from the locked position to the unlocked position in which the plug is selectively removable from the tubular body. The method thereafter includes biasing mandrel 113.1 having pre-determined outer diameter $D_{M.1}$ through the tubular body and into the pipe. The method includes determining that the pipe is acceptable if the mandrel extends therein, and determining that the pipe is unacceptable if the cylindrical member is inhibited from extending therein. The method may further include after the biasing step, re-connecting plug 96.1 to tubular body 60.1, with debris being inhibited from contacting end face 56.1 and interior 51.1 of pipe 50.1 once more.

FIGS. 12 to 15 show a pipe thread protector assembly 30.2 according to a further embodiment. Like parts have like numbers and functions as pipe thread protector assembly 30.1 shown in FIGS. 8 to 11B with the decimal extension "0.2" replacing decimal extension "0.1" and being added for parts not previously having a decimal extension. Pipe thread protector assembly 30.2 is substantially the same as pipe thread protector assembly 30.1 shown in FIGS. 8 to 11B with at least the following exceptions.

Figure 13:
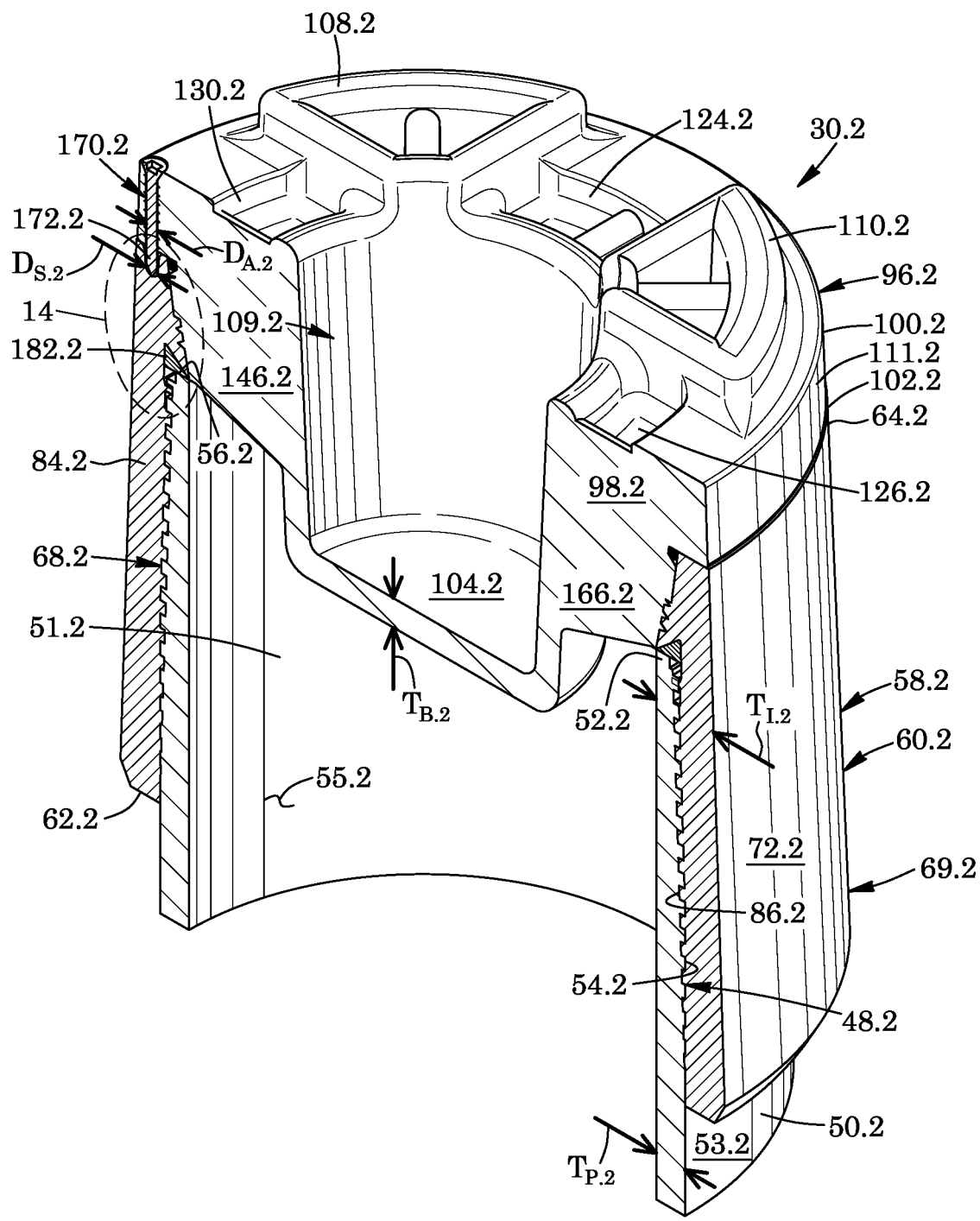
FIG. 13 is a sectional view taken along lines 13-13 of the pipe thread protector assembly and pipe of FIG. 12, with the pipe being shown in fragment.

As seen in FIG. 13, the end member, in this example removable, impact-absorbing plug 96.2 has a central, open-ended chamber 109.2 that is elongate. Central recessed portion 104.2 of the plug is spaced-apart below ribs 146.2 and 166.2. The ribs extend about and extend radially outwards from the chamber. Central recessed portion 104.2 of plug 96.2 is longitudinally inwardly spaced from outer end face 56.2 of the pipe 50.2 when the pipe is fully threadably coupled to tubular body 60.2 in this example. The central recessed portion of the plug is longitudinally inwardly spaced from seal 182.2 in this example. Chamber 109.2 and central recessed portion 104.2 of plug 96.2 are shaped to extend at least in part within interior 51.2 of pipe 50.2. The chamber and central recessed portion of the plug are shaped to extend at least in part within interior 68.2 and inner portion 84.2 of tubular body 60.2 of pin protector 58.2.

Figure 15:
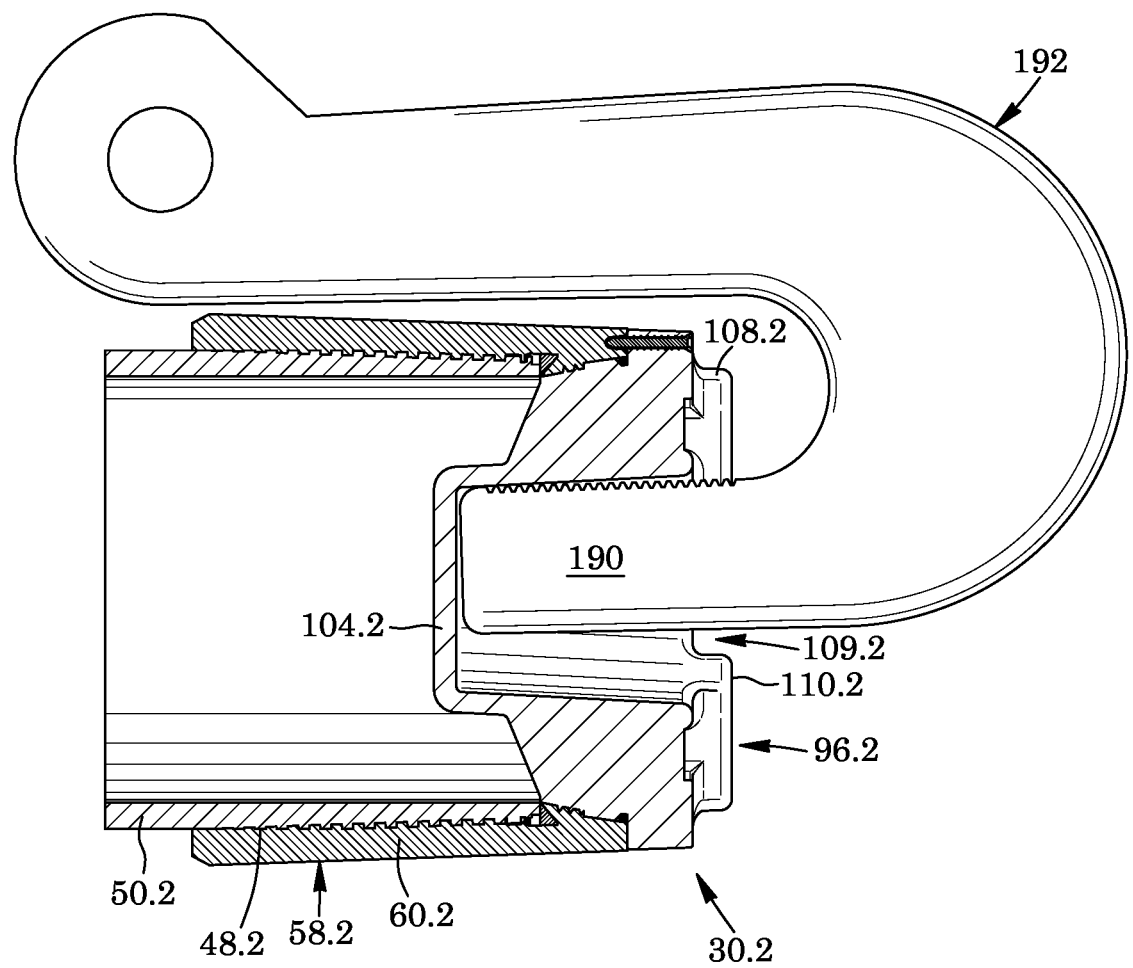
FIG. 15 is a longitudinal sectional view of the pipe thread protector assembly and pipe of FIG. 12, together with a hook shown coupling to the pin protector and lifting the pipe thereby.

As seen in FIG. 15, chamber 109.2 and recessed portion 104.2 of the plug are shaped to receive a distal end portion 190 of a hook 192. The hook is used to selectively pick up pipe 50.2. Pipe thread protector assembly 30.2 so shaped may thus facilitate manipulation of the pipe, including selectively raising, lowering and moving of the pipe.

Figure 14:
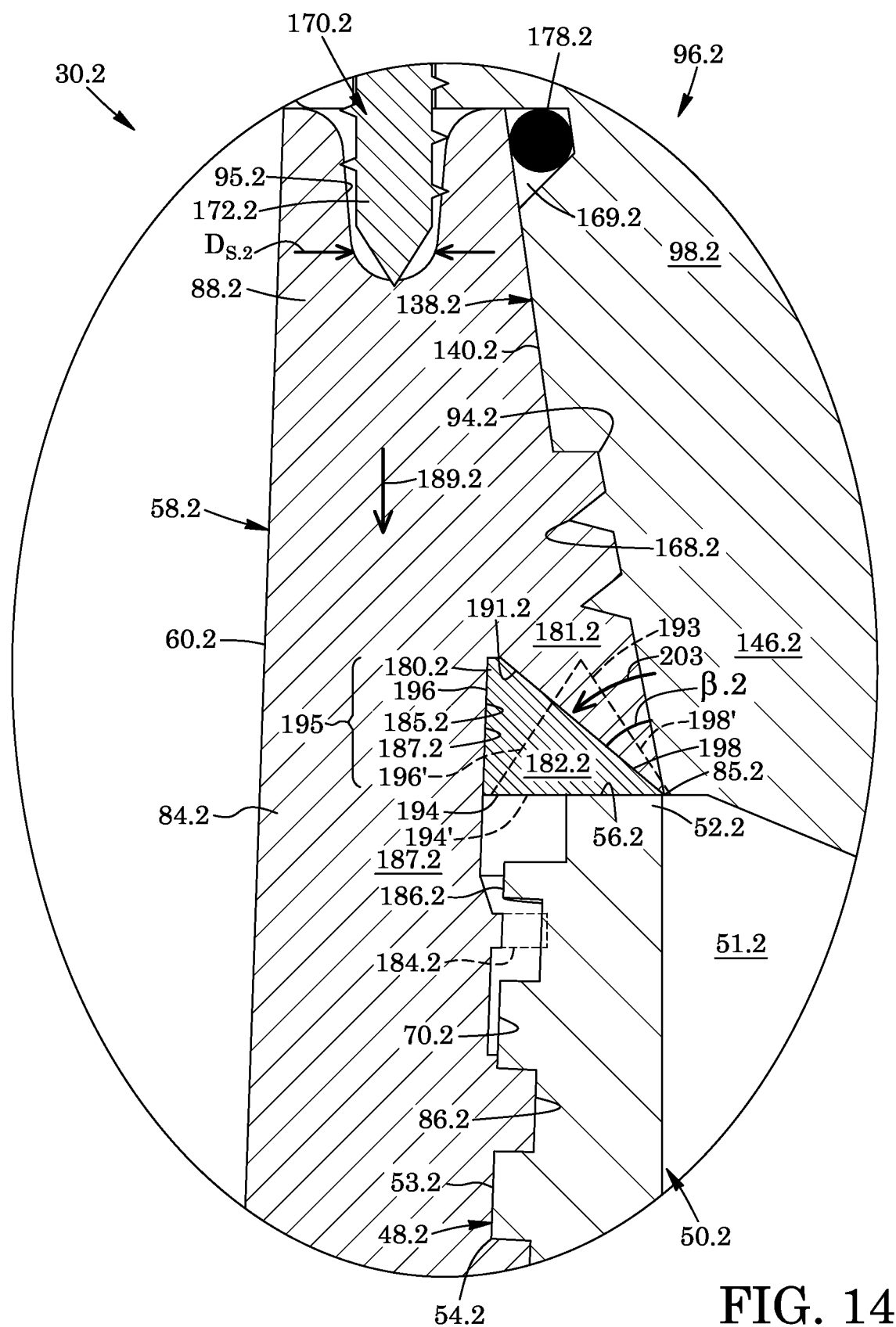
FIG. 14 is an enlarged sectional view of the pipe thread protector assembly and pipe of FIG. 13, with the pipe thread protector assembly and pipe shown in fragment.

As seen in FIG. 14, seal 182.2 is annular and triangular in lateral cross-section in this example in an uncompressed state as shown by dotted lines 193. The seal is shaped to move towards (as shown by arrow 203) and fit within tapered groove 180.2 in the compressed state as shown in solid lines. The seal has a first or inner face 194 that is planar in lateral section in this example. The inner face of seal 180.2 is shaped to cover and extend along outer end face 56.2 of pipe 50.2, thus inhibiting water or other contaminates from entering threading 54.2 of male threaded pipe 50.2 when plug 96.2 is removed. Inner face 194 of the seal may be coextensive with or greater in extent compared the outer end face of the pipe; however, this is not strictly required. The inner face of seal 182.2 is radially-extending in lateral section when in the compressed state shown in dotted lines 193 in this example.

Seal 182.2 has a second, radially-outward facing or peripheral face 196 which is planar in lateral section in this example. The peripheral face of the seal is radially outwardly facing at least in part. Peripheral face 196' of seal 182.2 is slanted in the uncompressed state of the seal shown in ghost 193 and from the perspective of FIG. 14. The peripheral face of the seal is shaped to extend along inner wall 187.2 of open pin protector 58.2 adjacent inner end 185.2 of the inner wall when the seal is in the compressed state by dotted lines 193. Peripheral face 196 of seal 182.2 abuts and may be coextensive with the sub-portion 195 of the inner wall of the open pin protector; however, this is not strictly required. The peripheral face 196 of seal 182.2 may be longitudinally extending in lateral section when in the compressed state shown in dotted lines 193.

The seal has a third, radially-inward facing or slanted face 198 which is planar in lateral section. Slanted face 198' is more angularly spaced from face 196 of seal 182.2 when the seal is in an uncompressed state. Slanted face 198 is shaped to extend along slanted shoulder 191.2 of tubular body 60.2 when seal 182.2 is in the compressed state shown by dotted lines 193. Slanted face 198 of seal 182.2 is slanted in lateral section when in the compressed state. The slanted face of the seal abuts and may be coextensive with slanted shoulder 191.2 of tubular body 60.2; however, this is not strictly required. The seal in its compressed state biases faces 194, 196 and 198 thereof against end face 56.2 of pipe 50.2, inner wall 187.2 of open pin protector 58.2, and shoulder 191.2 of tubular body 60.2. This thereby inhibits water ingress and promotes sealing of the end face of the pipe, threading 54.2 of the pipe, threading 86.2 of the tubular body and interference ring 184.2.

Figure 16:
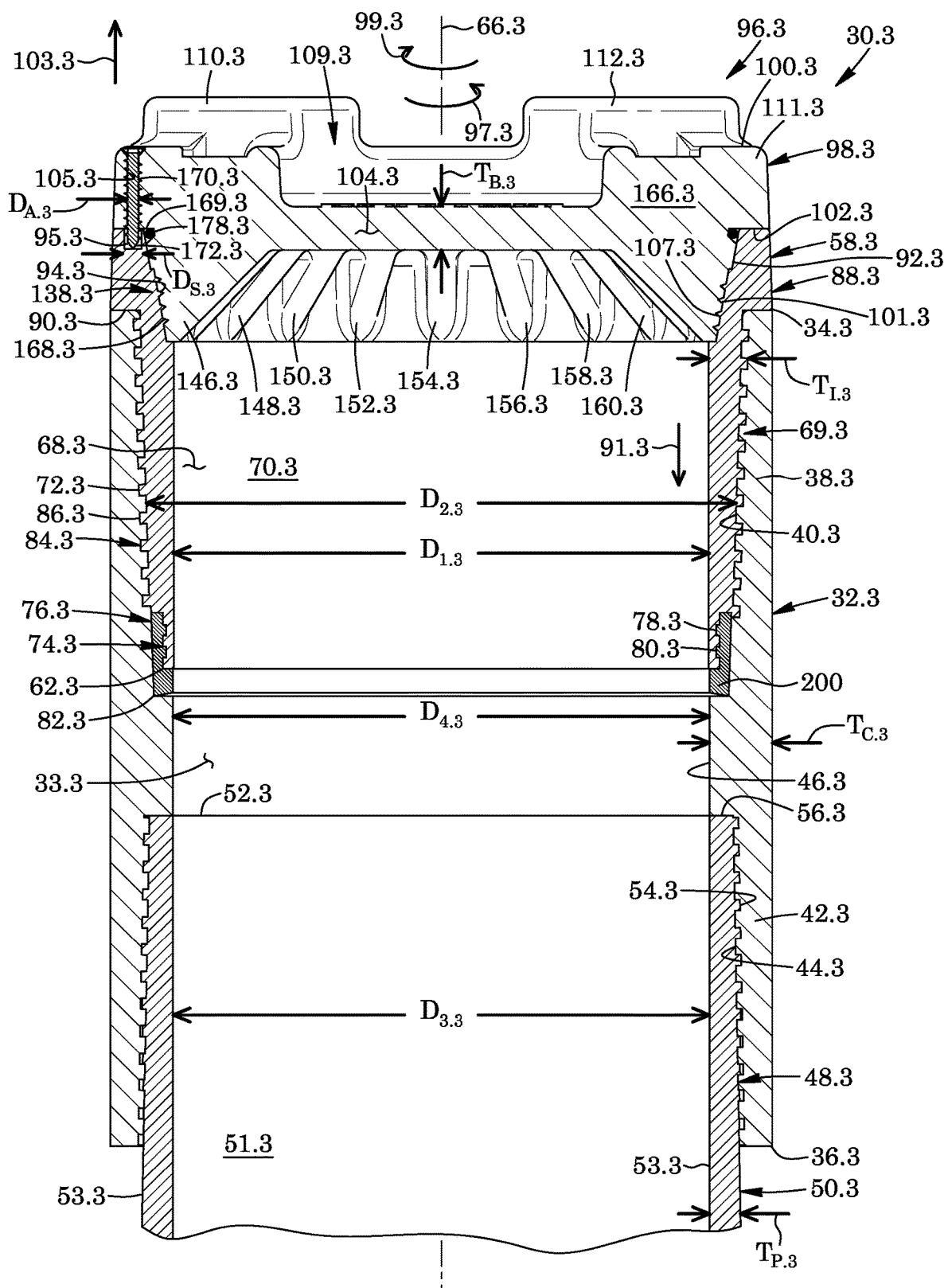
FIG. 16 is a longitudinal sectional view of a pipe thread protector assembly according to a fourth embodiment, together with an end portion of a pipe shown in fragment, the assembly including an open box protector comprising a tubular body with a removable end plug threadably coupled thereto, a seal coupled to an inner end of the tubular body, and a pipe coupling threadably coupling the tubular body and pipe together.

FIG. 16 shows a pipe thread protector assembly 30.3 according to yet another embodiment. Like parts have like numbers and functions as pipe thread protector assembly 30 shown in FIGS. 1 to 7B with the addition of decimal extension "0.3". Pipe thread protector assembly 30.3 is substantially the same as pipe thread protector assembly 30 shown in FIGS. 1 to 7B with at least the following exceptions.

Pipe coupling 32.3 has an inner shoulder 200 adjacent and in fluid communication with interior 33.3 thereof and right-handed threading 40.3 of first female member 38.3 thereof. Seal 76.3 is shaped to be received within, extend about and protect the inner shoulder of the pipe coupling when open box protector 58.3 and the pipe coupling are so coupled together.

Where a component (e.g. an assembly, device, member, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;
in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

Additional Description

Examples of pipe thread protector assemblies have been described. The following clauses are offered as further description.

(1) A pipe thread protector comprising: a tubular body shaped to protect a threaded end portion of a pipe or a pipe coupling; and an end member with an inner portion which is frustoconical in outer shape, configured to extend laterally across and threadably couple to the tubular body.

(2) A pipe thread protector comprising: a tubular body shaped to protect a threaded end portion of a pipe or a pipe coupling, the tubular body including an inner portion with a first of right-handed and left-handed threading, and the tubular body including an outer portion with a second of right-handed and left-handed threading; and an end member including the second of right-handed and left-handed threading via which the end member threadably couples to the outer portion of the tubular body.

(3) A pipe thread protector comprising: a tubular body shaped to protect a threaded end portion of a pipe or a pipe coupling; and an end member shaped to extend laterally across and selectively couple to the tubular body, wherein the end member has a thickness at least in part equal to or greater than that of the tubular body.

(4) A pipe thread protector comprising: a tubular body shaped to protect a threaded end portion of a pipe or a pipe coupling, the tubular body having an outer end, an inner end, and a tapered bore which tapers from the outer end thereof towards the inner end thereof; and an end member shaped to be received in part within the tapered bore, and extend laterally across and removably couple to the tubular body.

(5) A pipe thread protector comprising: a tubular body shaped to protect a threaded end portion of a pipe or a pipe coupling; an end member shaped to removably couple to and extend laterally across the tubular body; and a locking member moveable from a first position, in which removal of the end member from the tubular body is inhibited, to a second position in which the end member is selectively removable from the tubular body.

(6) The pipe thread protector of clause 5, wherein the locking member is a fastener threadably coupled to the end member and selectively extendable within a recess of the tubular body.

(7) The pipe thread protector of any of clauses 5 to 6, wherein the end member threadably couples to the tubular body.

(8) The pipe thread protector of any preceding clause wherein the tubular body has threading extending along an inner surface thereof from an inner end thereof towards an outer end thereof.

(9) The pipe thread protector of any one of clauses 1 to 7, wherein the tubular body has threading extending along an outer surface thereof via which the tubular body threadably couples to a female threaded end portion of a pipe coupling.

(10) The pipe thread protector of any preceding clause further including at least one annular seal positioned between the tubular body and the end member.

(11) The pipe thread protector of any one of clauses 1 to 9, further including a pair of annular spaced-apart seals, a first said seal aligning adjacent the outer end of the tubular body and a second said seal aligning adjacent the inner end of the end member.

(12) The pipe thread protector of any preceding clause, wherein the end member has a central portion with a thickness equal to or greater than that of the inner portion of the tubular body.

(13) A removable plug for a pipe thread protector, the plug comprising: a base member shaped to extend laterally across an open outer end of the pipe thread protector; one or more protrusions coupled to and extending axially outwards from an outer end of the base member; and an inner annular member coupled to, extending axially from, and tapering relative to an inner end of the base member.

(14) The plug of clause 10 further including one or more supporting ribs coupled to and extending inwards from the annular member.

(15) The plug of clause 11, wherein each said supporting rib extends radially in part and axially in part.

(16) The plug of any of clauses 14 to 15, wherein each said supporting rib is a triangular prism in shape.

(17) The plug of any one of clauses 14 to 16, wherein the one or more supporting ribs are circumferentially spaced-apart.

(18) A pipe thread protector comprising: a tubular body having an inner end, an outer end, and an inner surface along which extends threading from the inner end thereof towards the outer end thereof; and a protrusion coupled to and extending radially inwards from the inner surface of the tubular body adjacent the threading of the tubular body, whereby the protrusion is configured to deform upon rotatably coupling the tubular body to a male threaded end portion of a pipe, with the protrusion so deformed inhibiting removal of the pipe from the tubular body thereafter.

(19) The pipe thread protector of clause 18, further including a seal adjacent to and positioned in place via the protrusion.

(20) The pipe thread protector of clause 19, wherein the seal is positioned between the protrusion and the outer end of the tubular body.

(21) The pipe thread protector of any of clauses 18 to 20, wherein the seal is annular and positioned to align with a distal end of the pipe.

(22) The pipe thread protector of any of clauses 18 to 21, wherein the protrusion is positioned to align with the distal end of the pipe.

(23) The pipe thread protector of any of clauses 19 to 22, wherein the tubular body has an outer portion that extends from the outer end thereof towards the inner end thereof, extends radially inwards, and has an annular shoulder, and wherein the seal is positioned between the shoulder and the protrusion.

(24) The pipe thread protector of any of clauses 18 to 23, wherein the protrusion is annular.

(25) The pipe thread protector of any of clauses 18 to 24, wherein the protrusion is rectangular in longitudinal section.

(26) The pipe thread protector of any of clauses 18 to 25 wherein the protrusion has a longitudinal length which is less than that of the threading.

(27) The pipe thread protector of any of clauses 18 to 26 wherein the protrusion extends radially inwards from the inner surface a distance greater than that of the threading.

(28) The pipe thread protector of any of clauses 18 to 27, wherein the protrusion is cut into by threading of the pipe.

(29) The pipe thread protector of any of clauses 18 to 27 wherein the protrusion deformably couples to an outermost thread portion of the pipe.

(30) The pipe thread protector of any of clauses 18 to 28 wherein the protrusion is positionable adjacent to an outermost thread portion of the pipe.

(31) A pipe thread protector comprising: a tubular body shaped to protect a threaded end portion of a pipe or a pipe coupling; and a seal extending about the tubular body, the seal being triangular in lateral cross-section.

(32) The pipe thread protector of clause 31, wherein the seal is shaped to extend along an end face of the pipe.

(33) A pipe thread protector assembly comprising: a tubular body shaped to protect a threaded end portion of a pipe or a pipe coupling; an end member shaped to removably couple to and extend laterally across a first end portion of the tubular body; and a seal coupled to and extending about a second end portion of the tubular body spaced-apart from the first end portion of the tubular body.

(34) A pipe thread protector assembly comprising: a tubular body shaped to protect a threaded end portion of a pipe coupling; an end member removably coupled to the tubular body; and a seal extending about the tubular body and shaped to seal an inner shoulder of the pipe coupling.

(35) A pipe thread protector comprising: a tubular body shaped to protect a threaded end portion of a pipe or a pipe coupling; and an end member removably coupled to the tubular body, the end member having a central recessed region extending within the tubular body and being shaped to receive a hook at least in part.

(36) A pipe thread protector comprising: a tubular body shaped to protect a threaded end portion of a pipe or a pipe coupling; and a seal extending about the tubular body and shaped to seal an end face of the pipe or the pipe coupling, the seal having an inner diameter equal to or less than the inner diameter of the pipe or the pipe coupling.

(37) The pipe thread protector of clause 36, wherein the inner diameter of the seal is not more than $1/8^{th}$ smaller than the inner diameter of the pipe or the pipe coupling.

(38) The pipe thread protector of any one of clauses 36 to 37, further including an end member removably coupled to the tubular body.

(39) A method of transporting and drifting a pipe using the pipe thread protector assembly of any preceding clause, the method comprising: coupling together the tubular body and the end member of the pipe thread protector assembly; threadably connecting the tubular body and the end member so coupled together to the threaded end portion of the pipe or a pipe coupling of the pipe, with debris being inhibited from contacting the outer end face and interior of the pipe thereby; transporting the pipe, with the tubular body and the end member so coupled to the threaded end portion thereof, to a work site; drifting the pipe by removing the end member from the tubular body so coupled to the pipe or the pipe coupling of the pipe and thereafter biasing a cylindrical member having a pre-determined outer diameter through the tubular body and into the pipe; and determining that the pipe is acceptable if the cylindrical member extends therein, and determining that the pipe is unacceptable if the cylindrical member is inhibited from extending therein.

(40) The method of clause 39, further including after the biasing step, re-connecting the end member to the tubular body, with debris being inhibited from contacting the end face and interior of the pipe once more.

(41) The method of any one of clauses 38 to 39, wherein the pipe thread protector assembly further includes a locking member, wherein the method includes within the coupling together of the tubular body and the end member step, moving the locking member into a first position in which removal of the end member from the tubular body is inhibited, and wherein the method includes within the drifting the pipe step, moving the locking member from the first position to a second position in which the end member is selectively removable from the tubular body.

(42) An apparatus including any new and inventive feature, combination of features, or sub-combination of features as described herein.

(43) A pipe thread protector including any new and inventive feature, combination of features, or sub-combination of features as described herein.

(44) A removable plug for a pipe thread protector, the removable plug including any new and inventive feature, combination of features, or sub-combination of features as described herein.

(45) A pipe thread protector assembly including any new and inventive feature, combination of features, or sub-combination of features as described herein.

(46) Methods including any new and inventive steps, acts, combination of steps and/or acts or sub-combination of steps and/or acts as described herein.

It will be appreciated that many variations are possible within the scope of the invention described herein.

It is intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A pipe thread protector assembly comprising:
a tubular body shaped to protect a threaded end portion of a pipe or a pipe coupling and receive a cylindrical member therethrough for drifting the pipe; and
an impact-absorbing end member threadably connecting to and extending laterally across the tubular body, the end member being selectively removable from the tubular body and the end member being shaped to inhibit inward deformation of the tubular body.

2. An assembly according to claim 1, wherein the end member has a thickness that is equal to or greater in thickness than the tubular body at any region thereof.

3. An assembly according to claim 1, wherein one or more of: the tubular body has an outer end, an inner end, and a tapered bore which tapers from the outer end thereof towards the inner end thereof, with the end member being shaped to be received in part within the tapered bore; or the end member includes an inner portion which is frustoconical in outer shape.

4. An assembly according to claim 1, the assembly including a locking member moveable from a first position, in which removal of the end member from the tubular body is inhibited, to a second position in which the end member is selectively removable from the tubular body.

5. An assembly according to claim 4, wherein the locking member is a fastener threadably coupled to the end member and selectively extendable within a recess of the tubular body.

6. An assembly according to claim 1, wherein the tubular body includes a radially and longitudinally inwardly extending peripheral portion shaped to receive the end member, align adjacent to an outer end face of the pipe and receive a seal within a groove thereof, the peripheral portion and the seal being shaped to cover the outer end face of the pipe at least in part.

7. An assembly according to claim 1, the assembly including a seal extending about the tubular body, the seal being annual and triangular in lateral cross-section.

8. An assembly according to claim 1, the assembly including a seal extending about the tubular body and shaped to seal an inner shoulder of the pipe coupling.

9. An assembly according to claim 1, wherein the tubular body couples to the pipe or the pipe coupling via threading, and wherein the end member has a central recessed region extending within the tubular body so as to align at least in part with said threading.

10. A removable end member for a pipe thread protector according to claim 1, the end member comprising:
a base member shaped to extend laterally across an open outer end of the pipe thread protector;
one or more protuberances coupled to and extending axially outwards from an outer end of the base member; and
an inner annular member coupled to, extending axially from, and tapering relative to an inner end of the base member.

11. An end member according to claim 10, the end member including one or more supporting ribs and wherein one or more of: each said supporting rib couples to and extends inwards from the annular member; each said supporting rib extends radially in part and axially in part; each said supporting rib is a triangular prism in shape; or the one or more supporting ribs are circumferentially spaced-apart.

12. A pipe thread protector assembly according to claim 1, wherein the tubular body includes an inner portion with a first of right-handed and left-handed threading via which the tubular body threadably couples to the pipe or the pipe coupling, wherein the tubular body includes an outer portion with a second of right-handed and left-handed threading and wherein the end member includes the second of right-handed and left-handed threading via which the end member threadably couples to the outer portion of the tubular body.

13. A pipe thread protector assembly comprising:
a tubular body shaped to protect a threaded end portion of a pipe or a pipe coupling and receive a cylindrical member therethrough for drifting the pipe, the tubular body having an inner end, an outer end, and an inner surface along which extends threading from the inner end thereof towards the outer end thereof;
an impact-absorbing end member connecting to and extending laterally across the tubular body, the end member being selectively removable from the tubular body and the end member being shaped to inhibit inward deformation of the tubular body; and
a protrusion coupled to and extending radially inwards from the inner surface of the tubular body adjacent the threading of the tubular body, whereby the protrusion is configured to deform upon rotatably coupling the tubular body to a male threaded end portion of the pipe, with the protrusion so deformed inhibiting removal of the pipe from the tubular body thereafter.

14. A pipe thread protector assembly according to claim 13, wherein the protrusion is cut into by threading of the pipe and deformably couples to an outermost thread portion of the pipe, wherein the protrusion has a longitudinal length which is less than that of the threading and wherein the protrusion extends radially inwards from the inner surface a distance greater than that of the threading.

15. A method of transporting and drifting a pipe using a pipe thread protector assembly according to claim 1, the method comprising:
   coupling together the tubular body and the end member of the pipe thread protector assembly;
   threadably connecting the tubular body and the end member so coupled together to the threaded end portion of the pipe or a pipe coupling of the pipe, with debris being inhibited from contacting an outer end face and interior of the pipe thereby;
   transporting the pipe, with the tubular body and the end member so coupled thereto, to a work site;
   drifting the pipe by removing the end member from the tubular body so coupled to the pipe or the pipe coupling of the pipe, and thereafter biasing a cylindrical member having a pre-determined outer diameter through the tubular body and towards the interior of the pipe; and
   determining that the pipe is acceptable if the cylindrical member extends therein, and determining that the pipe is unacceptable if the cylindrical member is inhibited from extending therein.

16. A method according to claim 15, the method including after the biasing step, re-connecting the end member to the tubular body, with debris being inhibited from contacting the outer end face and the interior of the pipe once more.

17. A method according to claim 15, wherein the pipe thread protector assembly includes a locking member, wherein the method includes within the coupling together of the tubular body and the end member step, moving the locking member into a first position in which removal of the end member from the tubular body is inhibited, and wherein the method includes within the drifting the pipe step, moving the locking member from the first position to a second position in which the end member is selectively removable from the tubular body.

18. A pipe thread protector assembly comprising:
   a tubular body shaped to protect a threaded end portion of a pipe or a pipe coupling and receive a cylindrical member therethrough for drifting the pipe; and
   an impact-absorbing end member connecting to and extending laterally across the tubular body, the end member being selectively removable from the tubular body and the end member being shaped to inhibit inward deformation of the tubular body, wherein the end member has a thickness that is at least in part equal to or greater than that of the tubular body.

19. A pipe thread protector assembly comprising:
   a tubular body shaped to protect a threaded end portion of a pipe or a pipe coupling and receive a cylindrical member therethrough for drifting the pipe, wherein the tubular body has threading extending along an outer surface via which the tubular body threadably couples to a female threaded end portion of the pipe coupling; and
   an impact-absorbing end member connecting to and extending laterally across the tubular body, the end member being selectively removable from the tubular body and the end member being shaped to inhibit inward deformation of the tubular body.

20. A pipe thread protector assembly comprising:
   a tubular body shaped to protect a threaded end portion of a pipe or a pipe coupling and receive a cylindrical member therethrough for drifting the pipe;
   an impact-absorbing end member connecting to and extending laterally across the tubular body, the end member being selectively removable from the tubular body and the end member being shaped to inhibit inward deformation of the tubular body; and
   longitudinally spaced-apart first and second seals, the first seal being positioned between the tubular body and the end member and the second seal being positionable between the tubular body and the pipe.

\* \* \* \* \*